(12) United States Patent
Tabata et al.

(10) Patent No.: US 8,360,928 B2
(45) Date of Patent: Jan. 29, 2013

(54) DRIVE APPARATUS FOR VEHICLE

(75) Inventors: Atsushi Tabata, Okazaki (JP); Yutaka Taga, Aichi-ken (JP); Terufumi Miyazaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1013 days.

(21) Appl. No.: 11/663,858

(22) PCT Filed: Sep. 27, 2005

(86) PCT No.: PCT/JP2005/018251
§ 371 (c)(1),
(2), (4) Date: Mar. 21, 2008

(87) PCT Pub. No.: WO2006/035981
PCT Pub. Date: Apr. 6, 2006

(65) Prior Publication Data
US 2009/0029824 A1    Jan. 29, 2009

(30) Foreign Application Priority Data

Sep. 27, 2004 (JP) .................... 2004-280653
Sep. 27, 2004 (JP) .................... 2004-280654

(51) Int. Cl.
*B60K 6/445* (2007.10)
(52) U.S. Cl. .............. 477/4; 477/5; 180/65.235
(58) Field of Classification Search .......... 477/2, 3, 477/4, 5, 6; 180/65.225, 65.23, 65.235, 65.24, 180/65.25; 192/18 A
See application file for complete search history.

(56) References Cited

U.S. PATENT DOCUMENTS

| | | | | |
|---|---|---|---|---|
| 3,861,484 A | | 1/1975 | Joslin | |
| 4,335,429 A | * | 6/1982 | Kawakatsu | 701/102 |
| 4,458,794 A | * | 7/1984 | Yater | 192/18 A |
| 4,607,736 A | * | 8/1986 | Kelley | 192/18 A |
| 5,577,973 A | * | 11/1996 | Schmidt | 475/5 |
| 5,713,814 A | * | 2/1998 | Hara et al. | 477/5 |
| 5,775,449 A | | 7/1998 | Moroto et al. | |
| 6,022,287 A | * | 2/2000 | Klemen et al. | 475/5 |
| RE36,678 E | | 5/2000 | Moroto et al. | |
| 6,059,059 A | | 5/2000 | Schmidt-Brucken | |
| 6,190,283 B1 | | 2/2001 | Uchida | |
| 6,455,947 B1 | | 9/2002 | Lilley et al. | |
| 6,527,659 B1 | * | 3/2003 | Klemen et al. | 475/5 |
| 6,554,088 B2 | | 4/2003 | Severinsky et al. | |

(Continued)

FOREIGN PATENT DOCUMENTS

DE    199 16 489    10/2000
FR    2 814 121    3/2002

(Continued)

OTHER PUBLICATIONS

German Office Action dated May 14, 2009 for DE 112005002342.7.

(Continued)

*Primary Examiner* — Frank Vanaman
(74) *Attorney, Agent, or Firm* — Finnegan, Henderson, Farabow, Garrett & Dunner, LLP

(57) ABSTRACT

A drive apparatus for a vehicle includes a differential action limiting device for selectively switching a differential device in a differential state and a locked state, with the differential device and the differential action limiting device being disposed between a first electric motor and a second electric motor.

18 Claims, 10 Drawing Sheets

U.S. PATENT DOCUMENTS

| | | | |
|---|---|---|---|
| 6,579,201 B2 | 6/2003 | Bowen | |
| 6,592,484 B1 | 7/2003 | Tsai et al. | |
| 6,729,456 B2 | 5/2004 | Beneton et al. | |
| 6,953,409 B2 | 10/2005 | Schmidt et al. | |
| 2003/0064854 A1* | 4/2003 | Kotani | 477/3 |
| 2003/0102174 A1 | 6/2003 | Bordini | |

FOREIGN PATENT DOCUMENTS

| | | |
|---|---|---|
| FR | 2 837 429 | 9/2003 |
| JP | 5-180281 | 7/1993 |
| JP | 06-144020 | 5/1994 |
| JP | 09-226392 | 9/1997 |
| JP | 09-226393 | 9/1997 |
| JP | 10-058990 | 3/1998 |
| JP | 11-227476 | 8/1999 |
| JP | 2000-92611 | 3/2000 |
| JP | 2000-92612 | 3/2000 |
| JP | 2000-224813 | 8/2000 |
| JP | 2000-346187 | 12/2000 |
| JP | 2003-104072 | 4/2003 |
| JP | 2003-130202 | 5/2003 |
| JP | 2003-191759 | 7/2003 |
| JP | 2003-191761 | 7/2003 |
| JP | 2003-336725 | 11/2003 |
| JP | 2004-58921 | 2/2004 |
| JP | 2004-066898 | 3/2004 |
| JP | 2004-67021 | 3/2004 |
| JP | 2004-254468 | 9/2004 |

OTHER PUBLICATIONS

Communication dated Apr. 20, 2009 from EP Appln. No. 08 002 055.5.

* cited by examiner

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

DRIVE APPARATUS FOR VEHICLE

TECHNICAL FIELD

The present invention relates to drive apparatuses for vehicles and, more particularly, to a technology of enabling a drive apparatus to be minimized.

BACKGROUND ART

A drive apparatus for vehicle has heretofore been known as including a differential device through which an output of a drive power source, such as an engine or the like, is distributed to a first electric motor and a transmitting member through which the output thereof is mechanically transmitted to an output shaft of the drive apparatus, and a second electric motor between the transmitting member and drive wheels. A drive apparatus, disclosed in Patent Literature 1, includes a planetary gear unit as a differential device having a differential action through which a major part of power delivered from the engine is mechanically transmitted to drive wheels while enabling a remaining part of power from the engine to be electrically transmitted from a first electric motor to a second electric motor using an electrical path. Accordingly, a vehicle is made available to run with the engine maintained under an optimum operating state, enabling fuel consumption to be improved.

[Patent Literature 1] Japanese Patent Unexamined Application Publication No. 2003-191759

[Patent Literature 2] Japanese Patent Unexamined Application Publication No. 2003-191761

[Patent Literature 3] Japanese Patent Unexamined Application Publication No. 2003-336725

Such a conventional drive apparatus for vehicle includes an electric path for electric energy to be delivered from the first electric motor to the second motor, that is, a transmitting path through which a part of a drive power of the vehicle is transmitted in electrical energy. Therefore, with the development of the engine operating at a high output, the first motor needs to have a large size in structure. In addition, a need arises to increase a size of the second electric motor driven with electric energy output from the first electric motor. Thus, a problem arises for the drive apparatus to have a large size in structure.

The present invention has been made on the ground of the circumstances described above and has an object to provide a drive apparatus for vehicle that can be miniaturized in structure.

DISCLOSURE OF THE INVENTION

As a result of various studies conducted to address the above problem, the present inventors have found various matters. That is, the first electric motor and the second electric motor have no need to have so much increased sizes in an output region of the engine in common use where the engine output is relatively small. In a high-output region of the engine like a high-output run region, that is, for instance, the engine remains under the maximum output region, the first electric motor and the second electric motor need to have increased sizes with capacities or outputs in conformity to the demanded output. Thus, it is turned out that if the engine output is transmitted to the drive wheels mainly through a mechanical power transmitting path under a situation where the engine is operating in such a high-output region, the first electric motor and the second electric motor can be minimized in structure and the drive apparatus for vehicle can be compact in structure. The present invention has been completed on the ground of such findings.

The An embodiment of the invention includes a drive apparatus for vehicle having a differential device through which an output of a drive power source is distributed to a first electric motor and a transmitting member, and a second electric motor disposed between the transmitting member and drive wheels, the drive apparatus comprising (i) a differential action limiting device for selectively switching the differential device in a differential state and a locked state; (ii) and the differential device and the differential action limiting device being disposed between the first electric motor and the second electric motor.

According to some embodiments, the differential action limiting device allows the differential device in the drive apparatus for vehicle to be selectively placed in a differential state to function as an electrically continuously variable transmission and a locked state rendering the differential device inoperative. This enables a power transmitting state to be performed in a broad range. In addition, if the differential device is placed in the locked state in, for instance, the high-output running, the differential device is rendered operative to serve as the power transmission to electrically vary a shifting speed ratio under a region that lies in a low/intermediate speed running and a low/intermediate output running of the vehicle. This enables the maximum value of electrical energy to be generated by the first electric motor, that is, in other words, electric energy to be transmitted from the first electric motor, to be minimized with the resultant minimization of the motor. Moreover, an interspace between the two motors is effectively utilized as a space for accommodating the differential device and the differential action limiting device. Accordingly, the drive apparatus can be minimized in structure.

According to some embodiments, the drive apparatus for vehicle includes (i) a supporting member for rotatably supporting a rotor of the first electric motor, (ii) the differential device including three rotating elements including a first rotary element coupled to the drive power source, a second rotary element coupled to the first electric motor, and a third rotary element coupled to the transmitting member, (iii) the differential action limiting device including a clutch through which among the three rotating elements, two rotating elements are coupled to each other, and (iv) the clutch being placed on one side of the supporting member in opposition to the first electric motor.

According to some embodiments, the drive apparatus for vehicle includes (i) the differential device including three rotating elements having a first rotary element coupled to the drive power source, a second rotary element coupled to the first electric motor, and a third rotary element coupled to the transmitting member; (ii) the differential action limiting device including a brake through which the second rotary element is coupled to a non-rotating member, and (iii) the brake being placed in a radially outward area of the differential device.

According to some embodiments, the drive apparatus for vehicle includes (i) the differential device including three rotating elements having a first rotary element coupled to the drive power source, a second rotary element coupled to the first electric motor, and a third rotary element coupled to the transmitting member; (ii) the differential action limiting device including a clutch through which, of the three rotating elements, two rotating elements are coupled to each other, and a brake through which the second rotary element is coupled to a non-rotating member; and (iii) both the clutch and the brake including hydraulic-type frictionally coupling devices.

Thus, in a case where the clutch and brake includes hydraulic-type frictionally coupling devices, a need arises for hydraulic passages to be provided for supplying actuating oil from a hydraulic control circuit to the clutch and brake. In this case, if the clutch and brake are placed apart from each other, at least one of them becomes far from the hydraulic control circuit with the resultant fear of a difficulty encountered in performing a layout of hydraulic passages. According to the present invention, both the clutch and the brake are disposed between the two electric motors, providing an ease of performing a layout of hydraulic passages.

According to some embodiments, the drive apparatus for vehicle includes a gear device including a hydraulic-type frictionally coupling device disposed between the second electric motor and the drive wheels. In such a case, the gear device includes the clutch and the brake, having the hydraulic-type frictionally coupling devices serving as the differential device, and the hydraulic-type frictionally coupling device placed in an area closer to the drive wheels than the second motor. Thus, a particular problem arises in performing a layout of hydraulic passages extending from the hydraulic control circuit to the plural hydraulic-type frictionally coupling devices. However, in the illustrated embodiment, both the clutch and the brake are disposed between the two electric motors, they can be placed in a relatively short distance from the hydraulic-type frictionally coupling devices of the gear device, providing an ease of performing a layout of hydraulic passages.

According to some embodiments, the drive apparatus for vehicle includes (i) a partition wall provided in a case to partition an inside of the case into a plurality of compartments, (ii) the differential action limiting device including a brake including a plurality of friction plates and a piston for forcing the plurality of friction plates to be coupled to each other, for coupling rotating elements forming the differential device to a non-rotating member, and (iii) upon movement of the piston toward the partition wall, the piston and the partition wall pressurizing the plurality of friction plates into a coupled condition.

With such an arrangement, the brake allows the differential device in the drive apparatus for vehicle to be selectively placed in the differential state to function as the electrically continuously variable transmission and the locked state rendering the differential device inoperative. This enables the power transmitting state to be performed in a broad range. In addition, if the differential device is placed in the locked state in the high-output running, the differential device is rendered operative to serve as the power transmission to electrically vary a shifting speed ratio under a region that lies in the low/medium speed running and the low/medium output running of the vehicle. This enables the maximum value of electrical energy to be generated by the electric motor, that is, in other words, electric energy transmitted from the electric motor to be minimized with the resultant minimization of the electric motor or the drive apparatus including such a motor.

Moreover, the partition wall, with which the case is partitioned into a plurality of compartments, is used as a member for pressurizing the plurality of friction plates of the brake. Thus, no need arises for a separate member to be provided for pressurizing the plural friction plates, thereby enabling the drive apparatus to be shortened in an axial dimension by that extent.

According to some embodiments, the drive apparatus for vehicle includes the brake being placed in the radially outward area of the differential device. With such placement, the radially outward area of the differential device can be utilized as an air space for the brake to be placed, enabling the drive apparatus to be shortened in an axial dimension.

According to some embodiments, the drive apparatus for vehicle includes the partition wall serving to rotatably support the electric motor.

According to some embodiments, the differential action limiting device includes (i) a brake including a plurality of friction plates engageable with each other and a hub member supporting parts of the plurality of friction plates to be non-rotatable relative to each other, for coupling a rotary element forming the differential device to a non-rotary member; (ii) a clutch including a plurality of friction plates engageable with each other, a piston forcing the plurality of friction plates, and a cylinder member for accommodating the piston and operative to allow at least two rotating elements including a rotating element coupled to the non-rotating member with the brake, of rotating elements forming the differential device to be coupled to each other; and (iii) the cylinder member of the clutch and the hub member of the brake being unitized to each other by bonding.

With this, the clutch and the brake allows the differential device of the drive apparatus for vehicle to be selectively placed in a differential state, operative to serve as an electrically continuously variable transmission, and a locked state rendering the differential device inoperative. This enables a power transmitting state to be performed in a broad range. In addition, if the differential device is placed in the locked state in, for instance, the high-output running, the differential device is rendered operative to serve as the power transmission to electrically vary a shifting speed ratio under a region that lies in a low/medium speed running and a low/medium output running of the vehicle. This enables the maximum value of electrical energy to be generated by the electric motor, that is, in other words, electric energy to be transmitted from the electric motor, to be minimized with the resultant minimization of the motor or the drive device including such electric motor.

Further, the cylinder member of the clutch and the hub member of the brake are unitized to each other by bonding. This enables a reduction in the number of component parts in contrast to a case generally adopted in the conventional art wherein for blocking the axial movement of the hub member, thrust bearings or washers are placed on both sides of the hub member along an axial direction thereof, and a member is disposed to prevent the hub member from axially moving in opposition to the thrust bearings or washers.

According to some embodiments, the drive apparatus for vehicle includes the partition wall including hydraulic passages through which actuating oil is supplied to the piston of the clutch.

According to some embodiments, the drive apparatus for vehicle includes the brake being placed in the radially outward area of the differential device. With this, a radially outward air space of the differential device can be utilized as an air space for the brake to be placed, enabling the drive apparatus to be shortened in an axial dimension. Further, with the brake placed in the radially outward area of the differential device, in a case where the hub member of the brake is fixed in the axial position using the thrust bearings or washers, the thrust bearings or washers are positioned in a comparatively large diametric area with a high circumferential velocity. This causes an issue to arise in durability. However, even if the brake is placed in the radially outward area of the differential device, such a problem of durability does not occur in a case where the hub member of the brake is bonded to the cylinder member of the clutch.

According to some embodiments, the drive apparatus for vehicle includes the second electric motor operatively connected to a power transmitting path between the transmitting member and drive wheels, the differential device and the brake forming a continuously variable transmitting section functioning as an electrically continuously variable transmission, and upon release of the brake the continuously variable transmitting section being placed in a differential state to be operative as the electrically continuously variable transmission, and upon engagement of the brake the differential action of the continuously variable transmitting section is placed in a locked state.

EXPLANATION OF REFERENCES

8: engine (drive power source)
10: drive apparatus for vehicle
18: transmitting member
20: automatic transmission (gear device)
24: first planetary gear unit (differential device)
38: drive wheel
72: first support wall (supporting member)
12: transmission case (non-rotary member)
120: clutch cylinder (cylinder member)
136: brake hub (hub member)
140: brake piston
142: pressure plate (friction plate)
144: friction plate disc
S1: first sun gear (rotary element)
CA1: first carrier (rotary element)
R1: first ring gear (rotary element)
M1: first electric motor
M2: second electric motor
C0: switching clutch (hydraulic-type frictionally coupling device, differential action limiting device)
B0: switching brake (hydraulic-type frictionally coupling device, differential action limiting device)
C1, C2, B1, B2, B3: hydraulic-type frictionally coupling device

BEST MODE FOR CARRYING OUT THE INVENTION

Hereinafter, embodiments of the present invention will be explained with reference to attaching drawings.

Figures 1, 2:
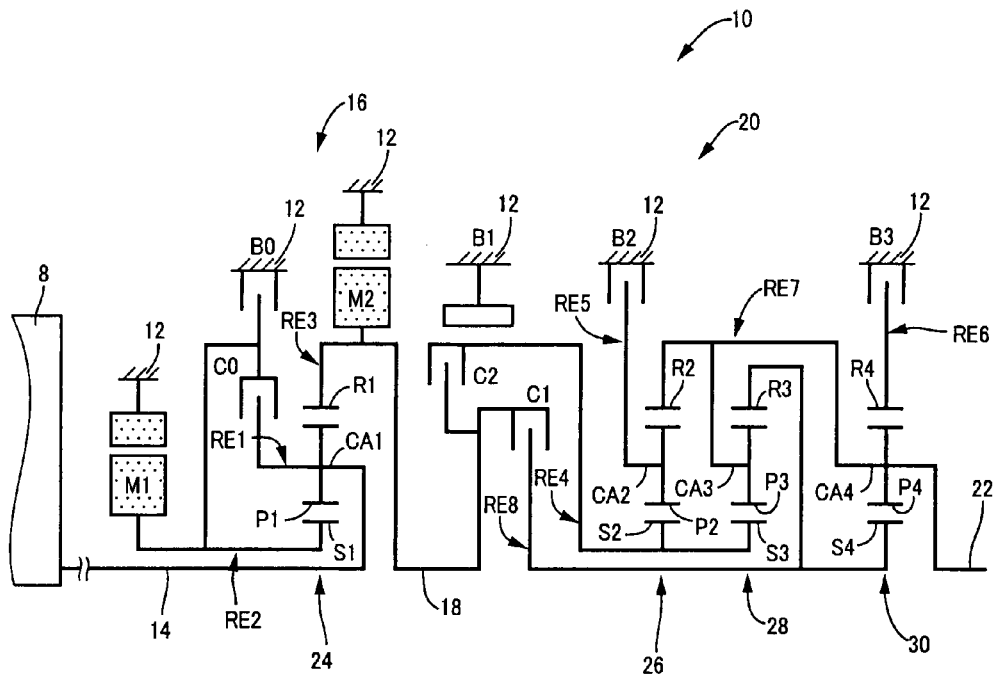
FIG. 1 is a skeleton view explaining a drive apparatus for a hybrid vehicle according to one embodiment of the present invention.
FIG. 2 is an operation Table indicating a relation between a shifting operation of the drive apparatus for the hybrid vehicle of the embodiment shown in FIG. 1 operable in a continuously-variable shifting state or a step-variable shifting state, and operation combinations of hydraulic-type frictionally coupling devices used therefor.

FIG. 1 is a skeleton view explaining a drive apparatus 10 for a hybrid vehicle according to one embodiment of the present invention. The drive apparatus 10 includes a drive apparatus input shaft 14, a power distribution mechanism 16, an automatic transmission 20 and a drive apparatus output shaft 22 all coaxially disposed in a transmission case 12 (hereinafter briefly referred to as "case 12") as a non-rotatable member fixed to a vehicle body. The drive apparatus input shaft 14 as an input rotation member is fixed to the case 12. The power distribution mechanism 16 is connected to the input shaft 14 directly or indirectly via a pulsation absorbing damper (vibration damping device) not shown. The automatic transmission 20 of a step-variable type is disposed between the distribution mechanism 16 and drive apparatus output shaft 22 to be connected thereto in series. The drive apparatus output shaft 22 as an output rotation member is connected to the automatic transmission 20.

Figure 7:
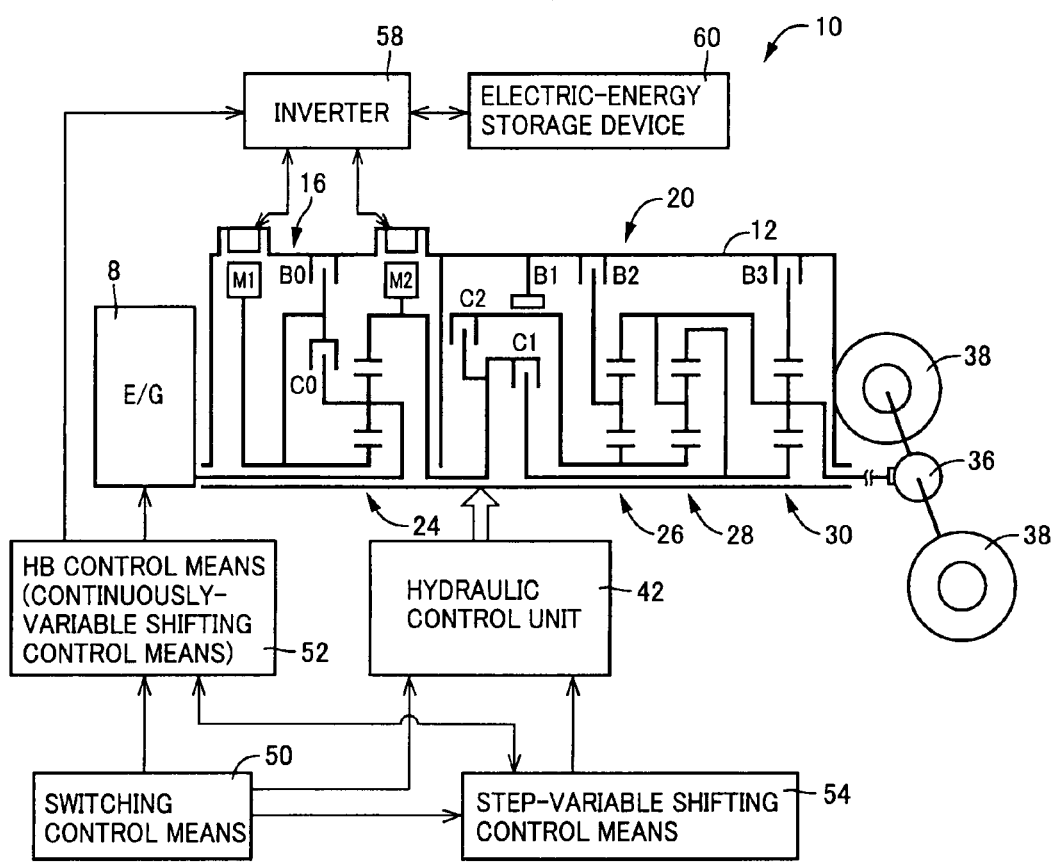
FIG. 7 is a functional block diagram explaining a main control operation performed by the electronic control device shown in FIG. 4.

This drive apparatus 10 is suitably used for a transverse FR vehicle (front-engine, rear-drive vehicle), and is disposed as shown in FIG. 7 between a drive power source in the form of an engine 8 and a pair of drive wheels 38, to transmit a vehicle drive force to the pair of drive wheels 38 through a differential gear device 36 (final speed reduction gear) and a pair of drive axles. It is noted that a lower half of the drive apparatus 10 constructed symmetrically with respect to its axis, is omitted in FIG. 1.

The power distribution mechanism 16 is a mechanical mechanism synthesizing or distributing the output of the engine 8 input to the drive apparatus input shaft 14. That is, it distributes the output of the engine 8 to the first electric motor M1 and the transmitting member 18, and synthesizes the outputs of the engine 8 and the first electric motor M1 to output it to the transmitting member 18. The second electric motor M2 is rotatable integral with the transmitting member 18. The second electric motor M2 may be disposed at any position of a power distributing path extending form the transmitting member 18 to the drive wheels 38. In the present embodiment, each of the first electric motor M1 and the second electric motor M2 is a so-called motor/generator also functioning as an electric generator. The first electric motor M1 should function at least as an electric generator to generate an electric energy while generating a reaction force, and the second electric motor M2 should function at least as an electric motor to generate a drive force of the vehicle.

The power distribution mechanism 16 includes a first planetary gear unit 24 functioning as a differential device, a switching clutch C0 and a switching brake B1. The first planetary gear unit 24 of single pinion type has a gear ratio $\rho1$ of about 0.418, for example. It has, as rotating elements, a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Representing the numbers of teeth of the first sun gear S1 and the first ring gear R1 by ZS1 and ZR1, respectively, the above gear ratio $\rho1$ is represented by ZS1/ZR1.

In the power distribution mechanism 16, the first carrier CA1 is connected to the drive apparatus input shaft 14, i.e., to the engine 8, the first sun gear S1 is connected to the first electric motor M1, and the first ring gear R1 is connected to the transmitting member 18. The switching brake B0 is disposed between the first sun gear S1 and the casing 12, and the switching clutch C0 is disposed between the first sun gear S1 and the first carrier CA1. Upon release of the switching clutch C0 and brake B0, the first sun gear S1, first carrier CA1 and first ring gear R1 are placed in a differential state to be rotatable relative to each other, to perform a differential function. Thus, the output of the engine 8 is distributed to the first electric motor M1 and the transmitting member 18, a part of the output distributed to the first electric motor M1 is used to generate power i.e, electricity thereat. The second electric motor M2 is driven for rotation by en electric energy generated at the first electric motor M1 or en electric energy stored. Accordingly, the power distribution mechanism 16 is placed in for example the continuously variable shifting state, in which the rotating speed of the transmitting member 18 changes continuously, irrespective of the rotating speed of the engine 8.

That is, the power distribution mechanism 16 is placed in the differential state in which a speed ratio $\gamma0$ (rotating speed of the driving device input shaft 14/rotating speed of the transmitting member 18) electrically changes from a minimum value $\gamma0$ min to a maximum value $\gamma0$ max. For example it is placed in the differential state, for example in the continuously variable shifting state, to function as an electrically continuously variable transmission of which the speed ratio $\gamma0$ continuously varies from the minimum value $\gamma0$ min to the maximum value $\gamma0$ max.

In this state, during the vehicle running by the output of the engine 8, when the first sun gear S1 and the first carrier CA1 are engaged integrally by engagement of the switching clutch C0, the rotating elements of the first planetary gear unit 24 including the first sun gear S1, first carrier CA1 and first ring gear R1 are placed in a locked state or a non-differential state to be rotatable as a unit. Thus, the rotating speeds of the engine 8 and the power transmitting member 18 are coincided with each other, so that the power distribution mechanism 16 is placed in a fixed shifting state functioning as the transmission having a fixed speed ratio $\gamma0$ equal to 1.

Then, by engagement of the switching brake B0 instead of the switching clutch C0, the power distribution mechanism 16 is placed in a locked state or non-differential state in which the first sun gear S1 is placed in a non-rotatable state, the rotating speed of the first ring gear R1 is made higher than that of the first carrier CA1, so that the power distribution mechanism 16 is placed in the fixed shifting state functioning as a speed-increasing transmission having a fixed speed ratio $\gamma0$ smaller than 1, for example, about 0.7.

In the present embodiment described above, the switching clutch C0 and brake B0 selectively place the first planetary gear unit 24 in the differential state and in the locked state, functioning as a differential action limiting device which limits or restricts the differential operation of the rotating elements. That is, in the differential state (continuously variable state), the first planetary gear unit 24 functions as the electrically controlled continuously variable transmission of which the shifting ratio can be continuously varied. In the locked state or the fixed shifting state, the first planetary gear unit 24 is inhibited its continuously variable shifting operation and impossible to function as the electrically controlled continuously variable transmission, being locked its shifting ratio variation. Thus, in the locked state, the first planetary gear unit 24 operates as the transmission which has the single gear position or multiple gear positions.

The automatic transmission 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio $\rho2$ of about 0.562.

The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio $\rho3$ of about 0.425. The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio $\rho4$ of about 0.421.

Representing the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4, respectively, the above gear ratios $\rho2$, $\rho3$ and $\rho4$ are represented by ZS2/ZR2, ZS3/ZR3, and ZS4/ZR4, respectively.

In the automatic transmission 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

The switching clutch C0, the first clutch C1, the second clutch C2, the switching brake B0, the first brake B1, the second brake B2 and the third brake B3 are hydraulic-type frictionally coupling devices used in a conventional vehicular automatic transmission. The frictionally coupling device includes a wet-type multiple-disc clutch in which a plurality of friction plates superposed on each other are forced against each other by a hydraulic actuator, or a band brake in which a rotary drum and one band or two bands wound on an outer circumferential surface thereof is tightened at one end by a hydraulic actuator. Each of the clutches C0 to C2 and brakes B0 to B3 is selectively engaged for connecting two members disposed at both sides thereof. Thus, in the first embodiment, the automatic transmission 20 provided with the first clutch C1 and the like as the hydraulic-type frictionally coupling device corresponds to the claimed gear device.

In the drive apparatus 10 thus constructed, as shown in an operation Table of FIG. 2, one of a first-gear position (first-speed position) through a fifth-gear position (fifth-speed position), a reverse-gear position (rear-drive position) and a neutral position is selectively established by engagement of the switching clutch C0, the first clutch C1, the second clutch C2, the switching brake B0, the first brake B1, the second brake B2 and the third brake B3. Those positions have respective speed ratios γ(input shaft speed$N_{IN}$/output shaft speed $N_{OUT}$) which change as geometric series.

In particular, in this embodiment, owing to provision of the switching clutch C0 and brake B0, the power distribution mechanism 16 can be selectively placed, in addition to the continuously-variable shifting state operable as the continuously variable transmission, in the fixed shifting state operable as the transmission of the single step or multiple steps having one or not less than two kinds of shifting ratio. In the drive apparatus 10, the step-variable transmission is constituted by the automatic transmission 20 and the power distribution mechanism 16 placed in the fixed shifting state engagement of the switching clutch C0 or the switching brake B0. Further, the continuously variable transmission is constituted by the automatic transmission 20 and the power distribution mechanism 16 placed in the continuously-variable shifting state, with none of the switching clutch C0 and brake B0 being engaged.

For example, when the drive apparatus 10 functions as the step-variable transmission, for example, as shown in FIG. 2, engagement of the switching clutch C0, the first clutch C1 and the third brake B3 establish the first-gear position having the highest speed ratio γ1 of about 3.357, for example, and engagement of the switching clutch C0, the first clutch C1 and the second brake B2 establish the second-gear position having the speed ratio γ2 of about 2.180, for example, which is lower than the speed ratio γ1. Further, engagement of the switching clutch C0, first clutch C1 and first brake B1 establish the third-gear position having the speed ratio γ3 of about 1.424, for example, which is lower than the speed ratio γ2, and engagement of the switching clutch C0, first clutch C1 and second clutch C2 establish the fourth-gear position having the speed ratio γ4 of about 1.000, for example, which is lower than the speed ratio γ3.

Engagement of the first clutch C1, second clutch C2 and switching brake B0 establish the fifth-gear position having the speed ratio γ5 of about 0.705, for example, which is smaller than the speed ratio γ4. Further, engagement of the second clutch C2 and the third brake B3 establish the reverse-gear position having the speed ratio γR of about 3.209, for example, which positions between the speed ratios γ1 and γ2. The neutral position N is established by engaging only the switching clutch C0.

However, when the drive apparatus 10 functions as the continuously-variable transmission, as shown in FIG. 2, the switching clutch C0 and the switching brake B0 are both released. With this, the power distribution mechanism 16 functions as the continuously-variable transmission, while the automatic transmission 20 connected in series thereto functions as the step-variable transmission. The rotating speed to be input to the automatic transmission 20 placed in one of the first-gear, second-gear, third-gear and fourth-gear positions, that is the rotating speed of the transmitting member 18 is continuously changed so that the continuous shifting ratio width can be obtained for each of the gear positions. Accordingly, since the speed ratio of the automatic transmission 20 is continuously variable across the adjacent gear positions, the overall speed ratio γT of the drive apparatus 10 is continuously variable.

Figure 3:
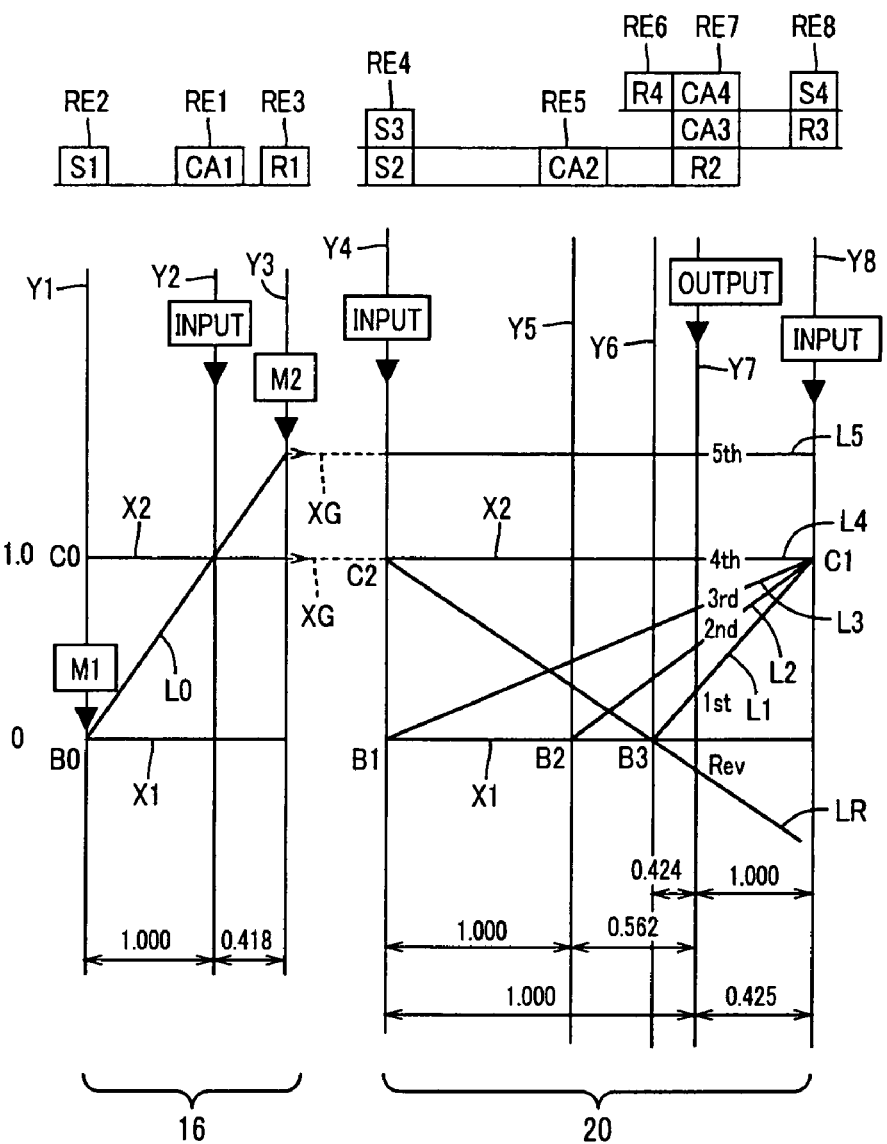
FIG. 3 is a collinear chart showing relative rotating speeds of rotating elements in each of different gear positions when the drive apparatus for the hybrid vehicle of the embodiment shown in FIG. 1 is operated in the step-variable shifting state.

FIG. 3 shows a collinear chart representing by straight lines a relation among the rotating speeds of the rotating elements different in each of the gear positions of the drive apparatus 10. The drive apparatus 10 is constituted by the power distribution mechanism 16 functioning as the continuously-variable shifting portion or first shifting portion, and the automatic transmission 20 functioning as the step-variable shifting portion or second shifting portion. The collinear chart of FIG. 3 is a rectangular two-dimensional coordinate system in which the gear ratios ρ of the planetary gear units 24, 26, 28 and 30 are taken along the horizontal axis, while the relative rotating speeds of the rotating elements are taken along the vertical axis. A lower one X1 of three horizontal lines indicates the rotating speed of 0, and an upper one X2 indicates the rotating speed of 1.0, that is, an operating speed $N_E$ of the engine 8 connected to the driving device input shaft 14. The horizontal line XG indicates the rotating speed of the transmitting member 18.

Among three vertical lines Y1, Y2 and Y3 corresponding to the three elements of the power distribution mechanism 16, respectively represent from the left the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio ρ1 of the first planetary gear unit 24. That is, when the distance between the vertical lines Y1 and Y2 is set to "1", the distance between the vertical lines Y2 and Y3 corresponds to the gear ratio ρ1.

Further, five vertical lines Y4, Y5, Y6, Y7 and Y8 corresponding to the automatic transmission 20 respectively represent from the left the relative rotating speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other.

The distances between the adjacent ones of the vertical lines Y4 to Y8 are determined by the gear ratios ρ2, ρ3 and ρ4 of the second, third and fourth planetary gear units 26, 28 and 30. That is, as shown in FIG. 3, for each of the second, third and fourth planetary gear units 26, 28 and 30, the distances between the sun gear and carrier corresponds to "1", and the distances between the carrier and ring gear corresponds to the gear ratio ρ.

Expressed by the collinear chart of FIG. 3, the drive apparatus 10 of this embodiment, is in the power distribution mechanism (continuously-variable shifting portion) 16, arranged such that the first rotary element RE1 (the first carrier CA1), which is one of the three rotating elements of the first planetary gear unit 24, is fixed to the drive apparatus input shaft 14, and selectively connected to the first sun gear S1 as another rotary element through the switching clutch C0. The second rotary element RE2 (the first sun gear S1) as another rotary element is fixed to the first electric motor M1 and selectively fixed to the casing 12 through the switching brake B0. The third rotary element RE3 (the first ring gear R1) as still another rotary element is fixed to the transmitting member 18 and the second electric motor M2.

Thus, a rotation of the drive apparatus input shaft 14 is transmitted (input) to the automatic transmission (step-variable transmission portion) 20 through the transmitting member 18. An inclined straight line L0 which passes an intersection point between the lines Y2 and X2 represents a relation between the rotating speeds of the first sun gear S1 and the first ring gear R1.

Figure 4:
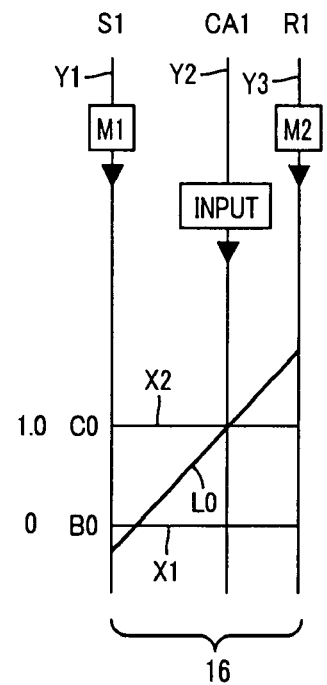
FIG. 4 is a view representing one example of the power distribution mechanism switched to the continuously variable shifting state, corresponding to the power distribution mechanism part in the collinear chart shown in FIG. 3.
Figure 5:
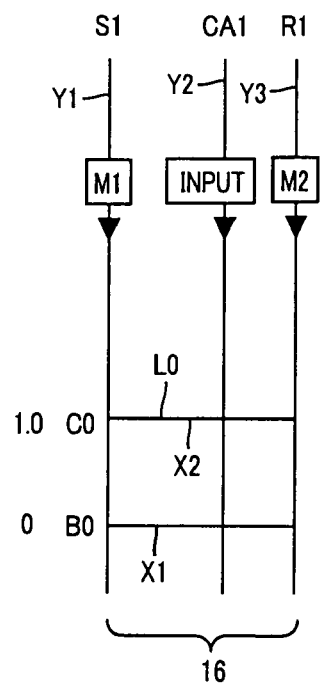
FIG. 5 is a view representing a state of the power distribution mechanism switched to the step-variable shifting state by engagement of the switch clutch C0, corresponding to the power distribution mechanism part in the collinear chart shown in FIG. 3.

FIGS. 4 and 5 are figures correspond to a part of the power distribution mechanism 16 of the collinear chart of FIG. 3. FIG. 4 shows one example of an operating state of the power distribution mechanism 16 placed in the continuously-variable shifting state with of the switching clutch C0 and the switching brake B0 held in the released state. The rotating speed of the first sun gear S1 represented by the intersection point between the straight line L0 and a vertical line Y1 is raised or lowered by controlling a reaction force resulted from a power generation at first electric motor M1, so that the rotating speed of the first ring gear R1 represented by the intersection point between the lines L0 and Y3 is lowered or raised.

FIG. 5 shows one example of a state of the power distribution mechanism 16 placed in the fixed shifting state with of the switching clutch C0 held in the engaged state. By connection of the first sun gear S1 and the first carrier CA1 the three rotating elements rotate as a unit, the line L0 being aligned with the horizontal line X2, which results in that the transmitting member 18 is rotated at the same speed as the engine speed $N_E$. When rotation of the transmitting member 18 is stopped by engagement of the switching brake B0, the rotating speed of the first ring gear R1 represented by an intersection point between the inclined straight line L0 and vertical line Y3, that is the rotation of the transmitting member 18 is made higher than the engine speed $N_E$ and transmitted to the automatic transmission 20.

In the automatic transmission 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the drive apparatus output shaft 22, and the eighth rotary element RE8 is selectively connected to the transmitting member 18 through the first clutch C1.

As shown in FIG. 3, in the automatic transmission 20, upon engagement of the first clutch C1 and the third brake B3, the rotating speed of the drive apparatus output shaft 22 in the first-speed position is represented by an intersection point between the inclined linear line L1 and the vertical line Y7. Here, the inclined straight line L1 passes an intersection point between the vertical line Y8 indicative of the rotating speed of the eighth rotary element RE8 and the horizontal line X2, and an intersection point between the vertical line Y6 indicative of the rotating speed of the sixth rotary element RE6 and the horizontal line X1.

Similarly, the rotating speed of the drive apparatus output shaft 22 in the second-speed position is represented by an intersection point between an inclined straight line L2 determined by engagement of the first clutch C1 and second brake B2, and the vertical line Y7 indicative of the rotating speed of the seventh rotary element RE7 fixed to the drive apparatus output shaft 22. The rotating speed of the drive apparatus output shaft 22 in the third-speed position is represented by an intersection point between an inclined straight line L3 determined by engagement of the first clutch C1 and first brake B1, and the vertical line Y7 indicative of the rotating speed of the seventh rotary element RE7 fixed to the drive apparatus output shaft 22. The rotating speed of the drive apparatus output shaft 22 in the fourth-speed position is represented by an intersection point between a horizontal line L4 determined by engagement of the first clutch C1 and second clutch C2, and the vertical line Y7 indicative of the rotating speed of the seventh rotary element RE7 fixed to the drive apparatus output shaft 22.

In the first-speed through fourth-speed positions, as result of engagement of the switching clutch C0, power from the power distribution mechanism 16 is input to the eighth rotary element RE8 with the rotating speed the same as that of the engine speed $N_E$. However, when the switching clutch B0 engages instead of the switching clutch C0, since power from the power distribution mechanism 16 is input to the eighth rotary element RE8 with a speed higher than the engine speed $N_E$, the rotating speed of the drive apparatus output shaft 22 in the fifth-speed position is represented by an intersection point between a horizontal line L5 and the vertical line Y7. Here, the horizontal line L5 is determined by engagement of the first clutch C1, second clutch C2 and switching brake B0, and the vertical line Y7 indicates the rotating speed of the seventh rotary element RE7 fixed to the output shaft 22. The rotating speed of the drive apparatus output shaft 22 in the reverse-gear position R is represented by an intersection point between an inclined straight line LR determined by engagement of the second clutch C2 and third brake B3, and the vertical line Y7 indicative of the rotating speed of the seventh rotary element RE7 fixed to the drive apparatus output shaft 22.

Figure 6:
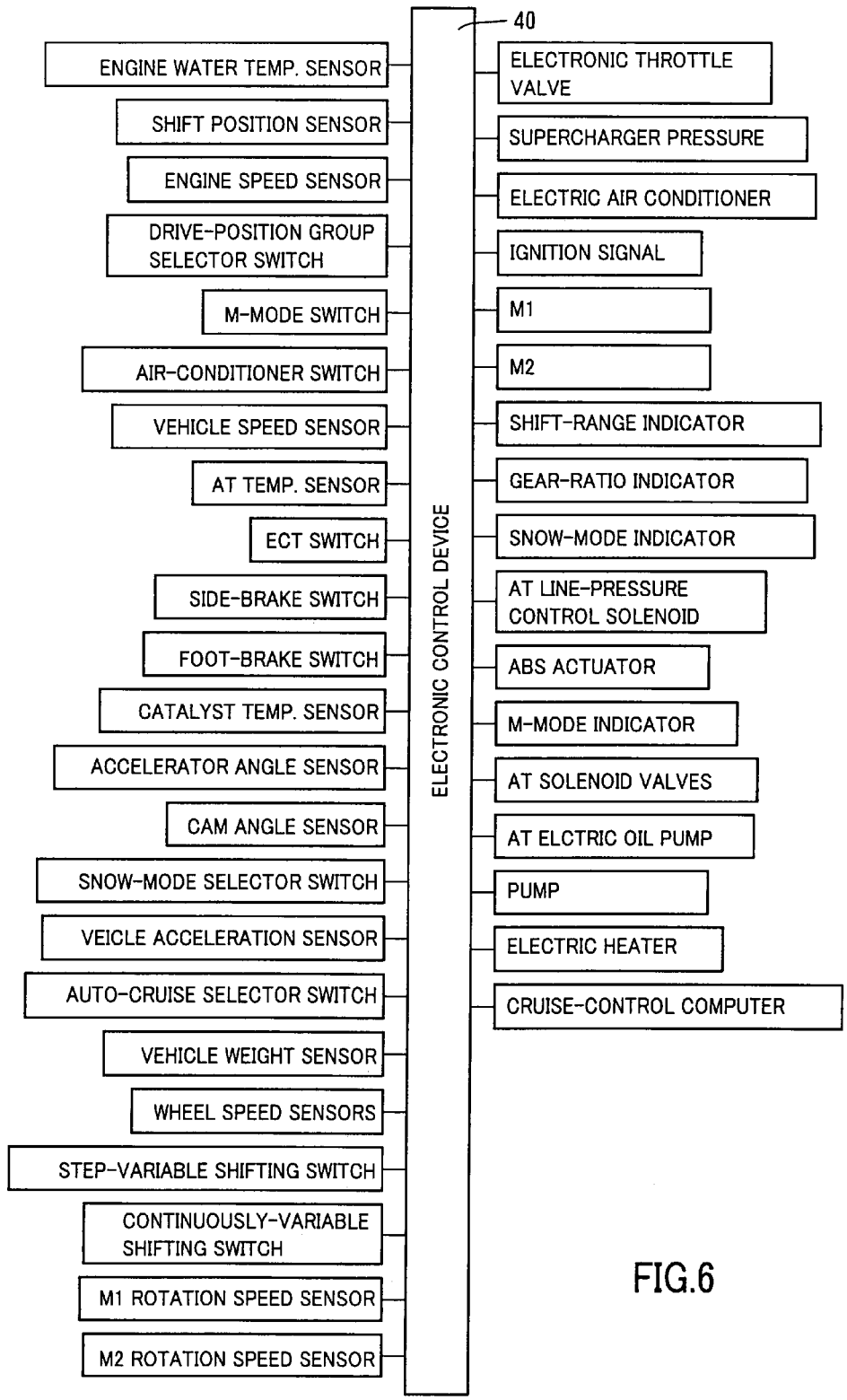
FIG. 6 is a view explaining input and output signals of an electronic control device provided in the drive apparatus of the embodiment shown in FIG. 1.

FIG. 6 illustrates signals input to an electronic control device 40 and signals output therefrom to control the drive apparatus 10. This electronic control device 40 includes a so-called microcomputer incorporating a CPU, a ROM, a RAM and an input/output interface. By performing signal processing according to programs stored in the ROM utilizing a temporary data storage function of the ROM, it implements hybrid drive controls of the engine 8 and electric motors M1 and M2, and drive controls such as shifting controls of the automatic transmission 20.

To the electronic control device 40, from various sensors and switches shown in FIG. 6, various signals are input, which include a signal indicative of a temperature of cooling water of the engine, a signal indicative of a selected operating position of a shift lever, a signal indicative of the operating speed $N_E$ of the engine 8, a signal indicative of a set value of gear ratio row, a signal indicative of a command for M mode (motor drive mode), a signal indicative of an operated state of an air conditioner, a signal indicative of a vehicle speed corresponding to the rotating speed of the drive apparatus output shaft 22, a signal indicative of a working oil temperature of the automatic transmission 20, a signal indicative of an operated state of a side brake, a signal indicative of an operated state of a foot brake, a signal indicative of a catalyst temperature, a signal indicative of an opened amount of an accelerator pedal, a signal indicative of a cam angle, a signal indicative of a snow drive mode, a signal indicative of a longitudinal acceleration value of the vehicle, and a signal indicative of an auto-cruising drive mode.

Also input are a signal indicative of a vehicle weight, a signal indicative of wheel speed of each drive wheel, a signal indicative of operation of a step-variable switch for changing the power transmitting mechanism 16 to the fixed shifting state so that the drive apparatus 10 functions as the step-variable transmission, a signal indicative of operation of a continuous-variable switch for changing the power transmitting mechanism 16 to the continuously-variable shifting state so that the drive apparatus 10 functions as the continuously-variable transmission, a signal indicative of the rotating speed $N_{M1}$ of the first electric motor M1, and a signal indicative of the rotating speed $N_{M2}$ of the second electric motor M2.

From the electronic control device 40, various signals are output, which include a signal to drive a throttle actuator for controlling an opening of a throttle valve, a signal to adjust a supercharger pressure; a signal to operate the electric air conditioner, a signal for controlling an ignition timing of the engine 8, signals to operate the electric motors M1 and M2, a signal to operate a shift-range indicator for indicating the selected operating position of the shift lever, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode.

Also output are signals to operate solenoid-operated valves incorporated in a hydraulic control unit 42 provided to control the hydraulic actuators of the hydraulically operated frictional coupling devices of the power distribution mechanism 16 and the automatic transmission 20, a signal to operate an electric oil pump used as a hydraulic pressure source for the hydraulic control unit 42, a signal to drive an electric heater, and a signal to be applied to a cruise-control computer.

FIG. 7 is a functional block diagram explaining a main control functions performed by the electronic control device 40. Switching control means 50 determines whether the vehicle condition is the continuously variable shifting region for placing the drive apparatus 10 in the continuously-variable shifting state, or in a step-variable shifting region for placing the same in the step-variable shifting state, based on a relation shown in FIG. 8 or FIG. 9 and stored in advance. In using the relation (shifting map) shown in FIG. 8, the vehicle condition is determined based on the actual operating speed $N_E$ of the engine 8 and a drive-force-related value related to the drive force of the hybrid vehicle such as an output torque $T_E$ of the engine.

Figure 8:
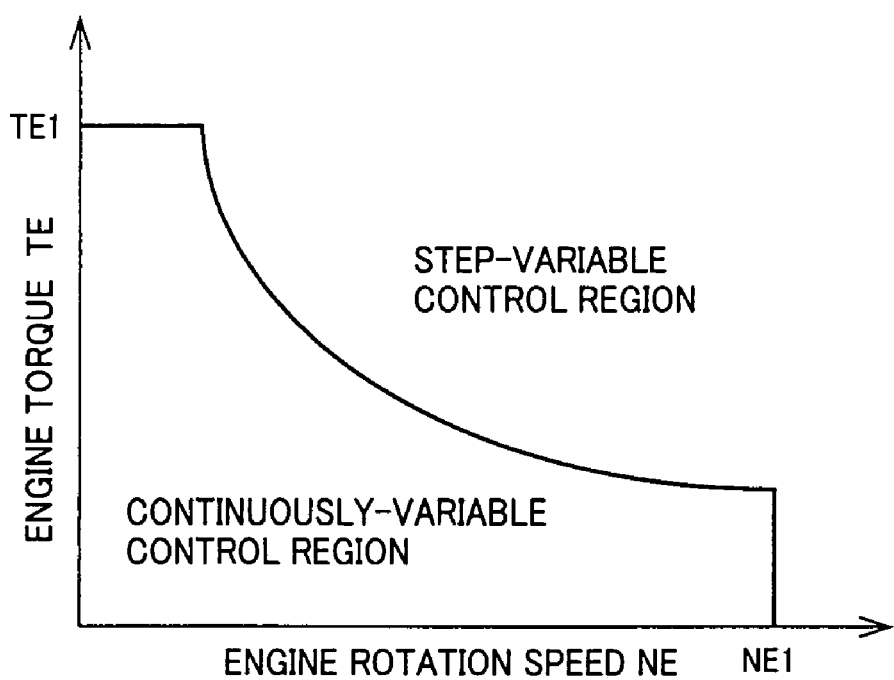
FIG. 8 is a view showing a relation memorized in advance to be used by switching control means shown in FIG. 7 for switching to the continuously variable control region or the step-variable control region.

In the relation shown in FIG. 8, three regions of a high-torque region, a high-rotation region, and a high-output region are set as the step-variable control region. In the high-torque region (high-output running region) the output torque $T_E$ of the engine 8 is not smaller than a predetermined value $T_{E1}$, in the high-rotation region (high-vehicle speed region) the engine speed $N_E$ is not lower than a predetermined value $N_{E1}$, that is the vehicle speed which is one of the vehicle condition determined by the rotating speed of the engine and the total shifting ratio $\gamma T$ is not less than the predetermined value, and in the high-output region the engine output determined by the output torque $T_E$ and speed $N_E$ of the engine 8 is not smaller than a predetermined value.

Accordingly, the step-variable shifting control is effected for the comparatively high torque, the comparatively high peed or the comparatively high output of the engine 8, so that the rotating speed of the engine 8 rhythmically changes in response to change of the rotating speed $N_E$ of the engine i.e., shifting upon up-shifting. In other words, in the high output running, in view of preference of the driver's requirement to the drive force than that to the fuel economy, the drive apparatus 10 is switched to the step-variable shifting state (fixed shifting state) than the continuously-variable shifting state. With this, the driver can enjoy the rhythmical change of the rotating speed $N_E$ of the engine.

To the contrary, in the normal output region of the engine, that is in the comparatively low torque, the comparatively low peed or the comparatively low output of the engine 8, the continuously-variable shifting control is effected. A boundary line in FIG. 8 between the step-variable control region and the continuously-variable control region, corresponds to a high vehicle speed determination line which is series of high vehicle speed determination points, and a low vehicle speed determination line which is series of low vehicle speed determination points.

Figure 9:
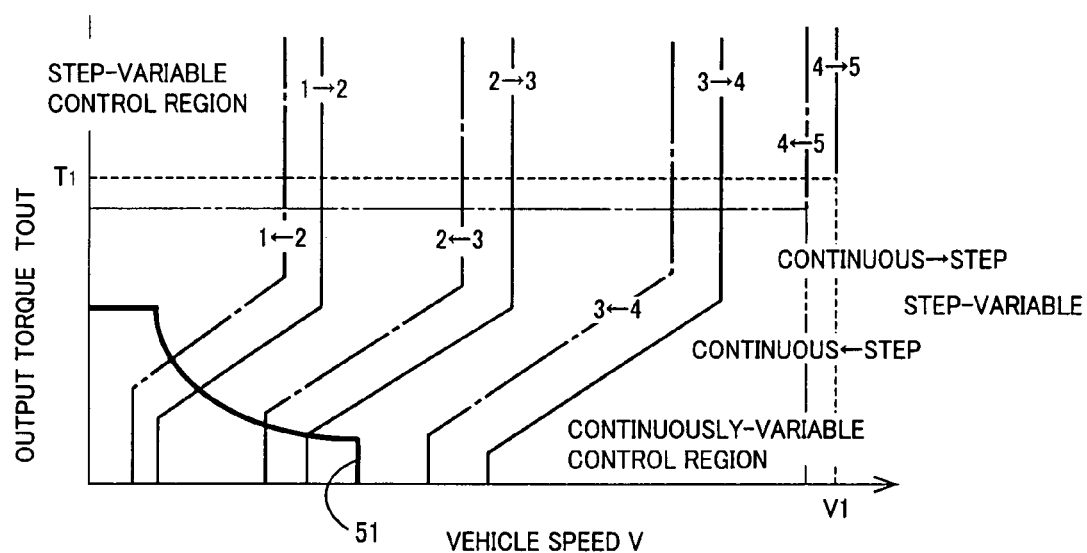
FIG. 9 is a view representing a relation memorized in advance to be used by the switching control means shown in FIG. 7, representing a relation different from the relation shown in FIG. 8.

On the other hand, in using the relation shown in FIG. 9, the above determination is performed based on the actual vehicle speed V and the output torque $T_{OUT}$ which is the drive-force-related value. In FIG. 9, a broken line represents a determination vehicle speed V1 and a determination output torque T1 for defining the predetermined condition to switch the continuously-variable control to the step-variable control. A two-chain dot line represents the condition for changing the step-variable control to the continuously-variable control. As apparent, hysteresis is provided between the step-variable control region and the continuously-variable control region. In FIG. 9, a region located at a lower output torque side and a lower vehicle speed side than the boundary line represented by a thick line is a motor running region for the vehicle to run by the drive force of the electric motor. In FIG. 9, shifting lines with the vehicle speed V and the output torque Tout as the parameter are shown as well.

The switching control means 50, determining the step-variable shifting region, outputs command to the hybrid control means 52 to inhibit the hybrid control or continuously-variable shifting control thereby, and commands to the step-variable shifting control means 54 to perform the predetermined shifting operation. The step-variable shifting control means 54, upon determination with FIG. 8, performs the automatic shifting control in accordance with the shifting diagram (not shown) memorized in advance. It performs the automatic shifting control, upon determination with FIG. 9, in accordance with the shifting diagram shown therein.

FIG. 2 shows the operation combinations of the hydraulically operated frictional coupling devices, that is the clutches C0, C1, C2, and the brakes B0, B1, B2 and B3, selected in the shifting control. In one of the first-speed position through the fourth-speed position of this step-variable automatic shifting control mode, the power distribution mechanism 16 functions as an auxiliary transmission having a fixed speed ratio $\gamma 0$ of 1, with engagement of the switching clutch C0. In fifth-speed position, by engagement of the switching brake B0 instead of the switching clutch C0, the power distribution mechanism 16 functions as an auxiliary transmission having a fixed speed ratio $\gamma 0$ of about 0.7. Thus, in the step-variable automatic shifting control mode, the drive apparatus 10 which includes the power distribution mechanism 16 functioning as the auxiliary transmission, and the automatic transmission 20, functions as a so-called automatic transmission as a whole.

The above drive-force-related value is a parameter corresponding to the drive force of the vehicle, which may be the drive torque or the drive force at the drive wheel. In addition, it may be an output torque $T_{OUT}$ of the automatic transmission 20, an engine output torque $T_E$, an acceleration value of the vehicle; an actual value such as the engine output torque $T_E$ calculated based on the operating angle of the accelerator pedal or the opening angle of the throttle valve (or intake air quantity, air/fuel ratio or amount of fuel injection) and the engine speed $N_E$; or an estimated value such as the engine output torque $T_E$ or required vehicle drive force calculated based on the amount of operation of the accelerator pedal by the vehicle operator or the operating angle of the throttle valve. The vehicle drive torque may be calculated based on not only the output torque $T_{OUT}$, etc., but also the ratio of a differential gear device of and the radius of the drive wheels 38, or may be directly detected by a torque sensor or the like. This is true for each of torques mentioned above.

On the other hand, when determining the continuously-variable control region, the switching control means 50 outputs command to the hydraulic control circuit 42 disposed for example at a lower part of the automatic transmission 20 to release the switching clutch C0 and the switching brake B0 for placing the power distribution mechanism 16 in the continuously-variable shifting state. In addition, the switching control means 50 outputs, simultaneously with the above command to the hydraulic control circuit 42 for releasing the switching clutch C0 and the switching brake B0, signal to the hybrid control means 52 for permitting the hybrid control, and to the step-variable shifting control means 54 one of following two signals.

One is the signal to hold the automatic transmission 20 in the gear position upon the continuously-variable shifting set advance, and other is to permit an automatic shifting according to the shifting diagram memorized in advance. In the latter case, the variable-step shifting control means 54 effects the automatic shifting by suitably selecting the combinations of the clutches and brakes shown in the operation Table of FIG. 2, except the combination of engagement of both the switching clutch C0 and brake B0.

Thus, by functions of the power distribution mechanism 16 as the continuously-variable transmission, and the automatic transmission connected in series thereto as the step-variable transmission, the drive force of suitable magnitude can be obtained. In addition, as described above, the rotating speed to be input to the automatic transmission 20 placed in one of the first-gear, second-gear, third-gear and fourth-gear positions, that is the rotating speed of the transmitting member 18 is continuously changed so that the continuous shifting ratio width can be obtained for each of the gear positions. Accordingly, since the speed ratio of the automatic transmission 20 is continuously variable across the adjacent gear positions, the overall speed ratio γT of the drive apparatus 10 is continuously variable.

The hybrid control means 52 controls the engine 8 to be operated in the high efficiency region, and controls the first electric motor M1 and the second electric motor M2 to establish an optimum proportion of the drive forces of the engine 8, the first electric motor M1 and/or the second electric motor M2. For instance, the hybrid control means 52 calculates the output as required by the driver at the current running speed of the vehicle based on the operating amount of the accelerator pedal and the vehicle running speed, and calculates a required drive force based on the required output calculated and a required charge amount by the first electric motor M1. Based on the required drive force calculated, the hybrid control means 52 calculates desired rotating speed $N_E$ and total output of the engine 8, and controls the actual output of the engine 8 and the generated electricity amount by the first electric motor M1, according to the calculated desired rotating speed and total output of the engine. The hybrid control means 52 effects the above hybrid control with taking account of the gear position of the automatic transmission 20 currently selected, or commands the shifting of the automatic transmission 20 to improve the fuel economy of the engine.

In such the hybrid control, the power distribution mechanism 16 is controlled to function as the electrically controlled continuously-variable transmission, for the optimum coordination of the rotating speed $N_E$ for efficient operation of the engine 8, and the rotating speed of the transmitting member 18 determined by both the vehicle speed and the selected gear position of the automatic transmission 20. That is, the hybrid control means 52 determines a target value of the overall speed ratio γT of the drive apparatus 10 so that the engine 8 is operated according to a highest fuel-economy curve memorized in advance that satisfies both the drivability and the highest fuel economy of the engine 8 upon running in the continuously-variable shifting. The hybrid control means 52 controls the shifting ratio γ0 of the power distribution mechanism 16 to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through it. Therefore, a main part of the drive force produced at the engine 8 is mechanically transmitted to the transmitting member 18, while the rest of the drive force is consumed by the first electric motor M1 to be converted into the electric energy, being supplied through the inverter 58 to the second electric motor M2, or subsequently consumed by the first electric motor M1. The drive force produced by operation of the second electric motor M2 or first electric motor M1 with the electric energy is transmitted to the transmitting member 18.

Components associated with from generation to consumption of the electric energy by the second electric motor M2 constructs the electric path for converting the power generated at the engine 8 to the electric energy and then convert the electric energy to the mechanical energy. Further, the hybrid control means 52 performs the motor running in which the vehicle is started and driven by the electric CVT function of the power distribution mechanism 16, irrespective of the stopped state or the idling state of the engine 8.

In the normal output region of the engine where the vehicle runs in the lower/medium speed and in the lower/intermediate output, the power distribution mechanism 16 is placed in the continuously-variable shifting state by the switching control means 50, the hybrid control means 52 and the step-variable shifting control means 54 to secure the fuel economy quality of the vehicle. In the high speed running or in the high rotation speed region of the engine 8, the power distribution mechanism 16 is placed in the fixed shifting state by the same to transmit the output of the engine 8 mainly through the mechanical power transmitting path to the drive wheel 38. Thus, the loss occurred upon conversion between power and electricity is suppressed to improve the fuel economy.

Figure 10:
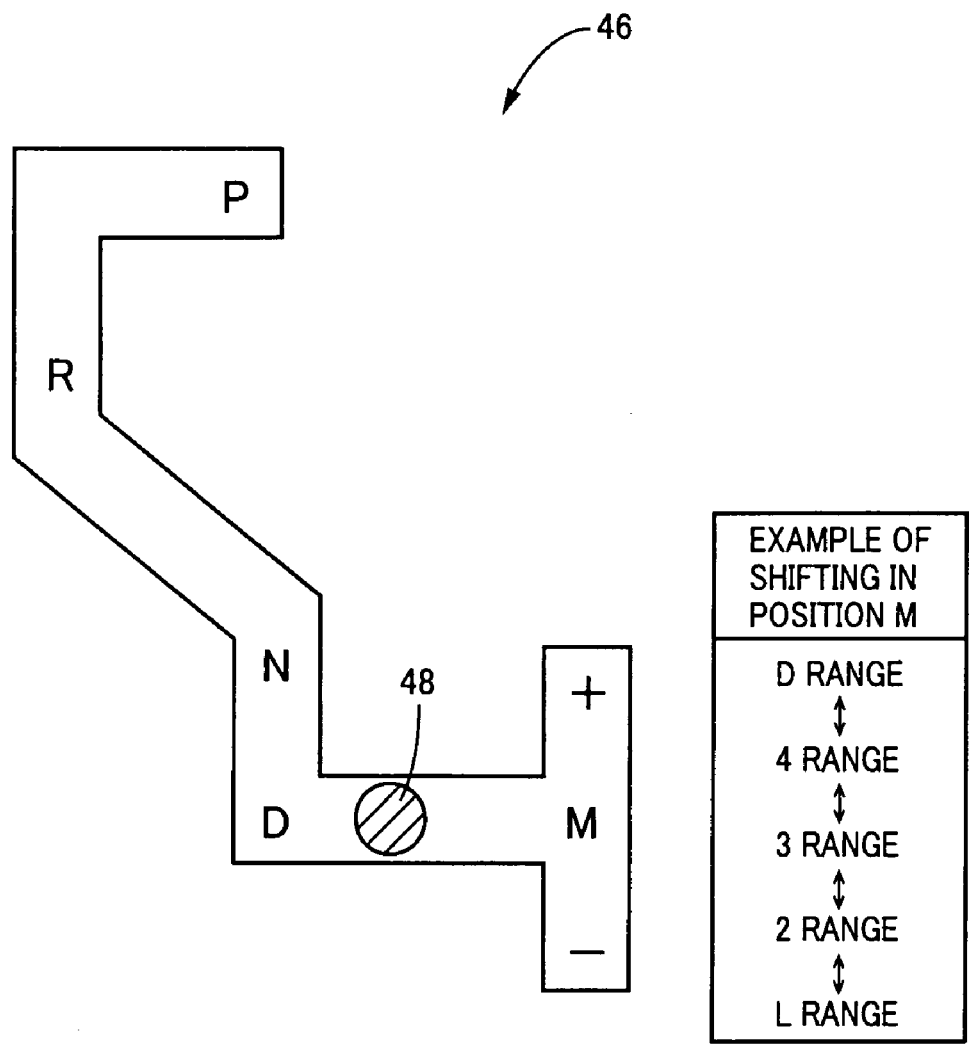
FIG. 10 is a view showing an example of a shift operation device 46 as a manually operable shifting device.

FIG. 10 shows an example of a shifting device 46 which is a manually operable shifting device. It is disposed laterally adjacent to an driver seat, for example, and has a shift lever 48 to be manually operated to select one of a plurality of gear positions including a parking position P, a reverse-drive position R, a neutral position N, an automatic forward-drive shifting position D, and a manual forward-drive shifting position M. Upon the parking position P, the drive apparatus 10 i.e., the automatic transmission 20 is placed in a neutral state where the power transmitting path is disconnected with release of the switching clutch C0 and brake B0, and simultaneously the drive apparatus output shaft 22 of the automatic transmission 20 is placed in the locked state. Upon the reverse-drive position R, the vehicle is driven in the rearward direction, and upon the neutral position N, the drive apparatus 10 is placed in the neutral state.

The parking position P and the neutral position N are non-running positions selected upon non-running of the vehicle, while the reverse-drive position R and the automatic and manual forward-drive shifting positions D and M are driving positions selected upon running of the vehicle. The automatic forward-drive shifting position D provides a highest-speed position, and positions "4" through "L" selectable therein are engine-braking positions for obtaining an engine brake.

The manual forward-drive shifting position M is located at the same position as the automatic forward-drive shifting position D in the vehicle longitudinal direction, and is spaced from or adjacent to the automatic forward-drive shifting position D in the vehicle lateral direction. The shift lever 48 is operated to the manual forward-drive shifting position M, for manually selecting one of the positions "D" through "L". Described in detail, the shift lever 48 is movable from the manual forward-drive shifting position M to a shift-up position "+" and a shift-down position "−" spaced from each other in the longitudinal direction. Each movement of shift lever 48 to the shift-up position "+" or the shift-down position "−", the currently selected position is changed to any of the positions "D" through "L" position.

The five positions "D" through "L" in the "M" position are plural kinds of shifting positions of which the total shifting ratios $\gamma T$ at the high-speed side (minimum side of the shifting ratio) are different in variable range of the total shifting ratio $\gamma T$ attainable by the automatic transmission 20 upon the automatic shifting control. They limit the shiftable range of the shifting position (gear position) so that the shifting positions at the maximum speed side attainable by shifting of the automatic transmission 20 are different. The shift lever 48 is biased by biasing means such as a spring to be automatically returned from the shift-up position "+" and shift-down position "−" back to the manual forward-drive shifting position M. The shifting device 46 is provided with shift-position sensors (not shown) to detect each shifted position of the shift lever 48, position of the shift lever 48 and the number of the shift operation of the shift lever 48 at the manual forward-shifting position "M" are output to the electronic control device 40.

For example, when the shift lever 48 is operated to the automatic forward-drive shifting position "D", the switching control means 50 effects an automatic switching control of the drive apparatus 10, the hybrid control means 52 effects the continuously-variable shifting control of the power distribution mechanism 16, and the step-variable shifting control means 54 effects an automatic shifting control of the automatic transmission 20. When placed in the step-variable shifting state for the step-variable shifting running, for example, shifting of the drive apparatus 10 is automatically controlled to select an appropriate one of the first-gear position through the fifth-gear position indicated in FIG. 2.

When placed in the continuously-variable shifting state for the continuously-variable shifting running, the overall speed ratio $\gamma T$ of the drive apparatus 10 is controlled to be continuously variable within the predetermined range, which is obtained by the shifting ratio width of the power distribution mechanism 16 continuously variable and one of the first-gear through fourth-gear positions of the automatic transmission 20 automatically controlled. The automatic forward-drive position "D" is a position selected to establish an automatic shifting mode (automatic mode) in which the drive apparatus 10 is automatically shifted.

When the shift lever 48 is operated to the manual forward-drive shifting position "M", shifting of the drive apparatus 10 is automatically controlled by the switching control means 50, hybrid control means 52 and step-variable shifting control means 54, such that the overall speed ratio $\gamma T$ varies within a predetermined range which can be attainable by each shifting position of the drive apparatus 10, not to exceed the shifting position or shifting ratio at the maximum side of the shifting range. When the drive apparatus 10 is placed in the step-variable shifting state, for example, shifting of the drive apparatus 10 is automatically controlled within the predetermined range of the overall speed ratio $\gamma T$. In the continuously-variable shifting state for the continuously-variable shifting running, the overall speed ratio $\gamma T$ of the drive apparatus 10 is controlled to be continuously variable within the predetermined range in each shifting position, which is obtained by the shifting ratio width of the power distribution mechanism 16 continuously variable, and one of the first-gear through fourth-gear positions of the automatic transmission 20 automatically controlled. The manual forward-drive position "M" is a position selected to establish a manually shifting mode (manual mode) in which the selectable gear positions of the drive apparatus 10 are manually selected.

Figure 11:
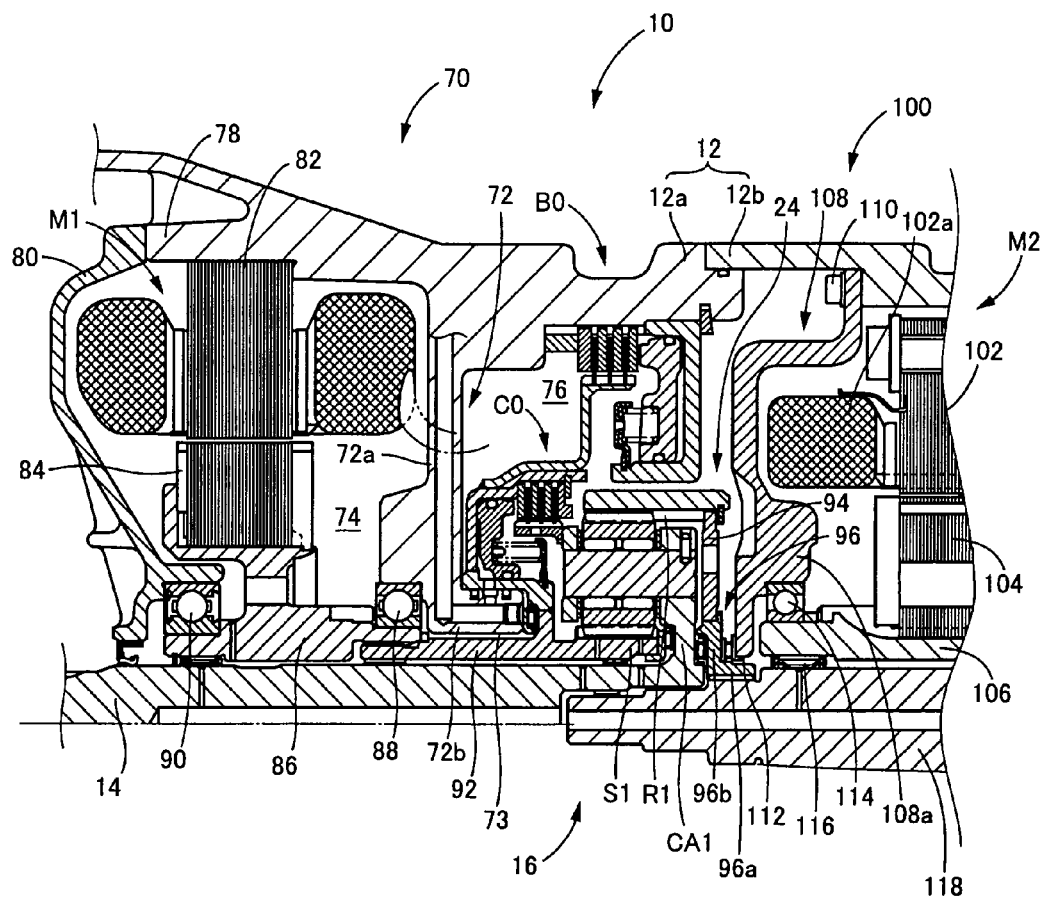
FIG. 11 is a partial sectional-view of the drive apparatus shown in FIG. 1.

FIG. 11 is a cross sectional view of essential parts of the drive apparatus 10. As shown in FIG. 11, the drive apparatus 10 comprises the case 12 including a first case 12a for accommodating the first electric motor M1 and the power distribution mechanism 16 and a second case 12b for accommodating the second electric motor M2 and the automatic power transmission 20, not shown. In addition, the first case 12a and the first electric motor M1 and the power distribution mechanism 16 accommodated therein form a first unit 70. The second case 12b and the second electric motor M2 and the automatic power transmission 20 accommodated therein form a second unit 100.

The first case 12a, having an outer diametric outline formed in a substantially cylindrical shape, has a nearly fixed outer diametric portion to accommodate the power distribution mechanism 16, and another outer diametric portion increasing in diameter toward the engine 8 (leftward in the drawing figure) in an area to accommodate the first electric motor M1. Moreover, the first case 12a has both sides opened in an axial direction and a first supporting wall 72 integrally formed therewith. The first supporting wall 72 also functions as a partition wall 72.

The first supporting wall 72 comprises a vertical section 72a substantially perpendicular to the drive apparatus input shaft 14, and a tubular section 72b having one axial end connected to an inner peripheral end of the vertical section 72a and extending toward the first planetary gear unit 24. The tubular section 72b has a central axis along which a through-bore 73 is formed so as to extend in an axial direction. With the first case 12a partitioned by the first supporting wall 72, the first case 12a is partitioned into a first accommodating compartment 74 facing the engine 8 for accommodating the first electric motor M1, and a second accommodating compartment 76 for accommodating the power distribution mechanism 16. In addition, the first electric motor M1 is accommodated in the first accommodating compartment 74 from a left side in the drawing, and the power distribution mechanism 16 is accommodated in the second accommodating compartment 76 from a right side in the drawing.

Further, the first case 12a has an annular protrusion 78 axially protruding toward the engine 8 in parallel to the drive apparatus input shaft 14 to allow the first accommodating compartment 74 to have a nearly fixed diameter. A lid cover plate 80 has an outer circumferential periphery fixed to the annular protrusion 78 in abutting engagement therewith.

The first electric motor M1 comprises a first stator (stationary part), a first rotor (rotator) 84, and a first rotor-supporting shaft (rotary shaft) 86 unitarily formed with the first rotor 84. The first supporting wall 72 functions as a supporting member, and an inner peripheral wall of the first supporting wall 72 supports one end, that is, an end facing thereto, of the first rotor-supporting shaft 86 via a bearing 88. In addition, the first rotor-supporting shaft 86 has the other end supported with the lid cover plate 80 by means of a bearing 90.

The sun gear shaft 92 functions as a power transmitting shaft, through which the first electric motor M1 and the first planetary gear unit 24 are connected to each other in power transmitting capability. The sun gear shaft 92 is unitarily formed with the first sun gear S1 and extends toward an inner peripheral area of the first rotor-supporting shaft 86 through the through-bore 73 formed at the center of the partition wall 72. The sun gear shaft 92 has one end, facing the first rotor-supporting shaft 86, which is coupled to an end of the first rotor-supporting shaft 86 in an area closer to the partition wall 72 by means of a spline 158 for unitary rotation of the sun gear shaft 92 and the first rotor-supporting shaft 86.

The drive apparatus input shaft 14 is made rotatable relative to the first rotor-supporting shaft 86 and the sun gear shaft 92 at the central axis of the first case 12a inside of the rotor-supporting shaft 86 and the sun gear shaft 92. In addition, one end of the drive apparatus input shaft 14 is integrally connected to the first carrier CA1. Thus, the drive apparatus input shaft 14 integrally connected to the first carrier CA1 also functions as an input shaft of the first planetary gear unit 24.

An annular plate 94 is fixed to an inner peripheral wall of the first ring gear R1 of the first planetary gear unit 24 on one end thereof facing the second unit 100, that is, in an area opposite to the first supporting wall 72 to be immovable in axial and circumferential directions. The annular plate 94 extends in a direction perpendicular to the central axis of the drive apparatus input shaft 14 and has an axis formed with a bore. The first planetary gear unit 24 has an output shaft (that is, an output shaft of the power distribution mechanism 16) 96 that includes a tubular shaft portion 96a protruding toward the second unit 100, that is, in a direction opposite to the first supporting wall 72, and a flange portion 96b protruding radially outward from the shaft portion 96a at a position closer to the first planetary gear unit 24. The flange portion 96b is joined to the annular plate 94 for unitary rotation of the output shaft 94 and the annular plate 94. The switching clutch C0 is interposed between the first supporting wall 72 and the first planetary gear unit 24, and the switching brake B0 is disposed in an outer circumferential area of the first planetary gear unit 24.

The electric motor M2 comprises a second stator 102, a second rotor 104, and a second rotor-supporting shaft 106 unitarily rotatable with the second rotor 104. A second supporting wall 108 is placed on the second case 12b in an area closer to an opening (facing the first case 12a) thereof than the second electric motor M2. The second supporting wall 108 is fixed to the second case 12b by means of bolts 110 and formed with a through-bore 112 at a radial center so as to extend in an axial direction. In addition, the second supporting wall 108 has a convexed portion 108a formed in an area radially inward of a stator coil 102a of the second stator 102 so as to axially protrude toward the second rotor 104. The convexed portion 108a has an inner periphery with which a bearing 114 is held in abutting engagement.

The second rotor-supporting shaft 106 has one end supported with the second supporting wall 108 by means of the bearing 114. Further, the second rotor-supporting shaft 106 supports an input shaft 118 of the automatic power transmission 20 by means of a bearing 116 disposed inside of the bearing 114 at an end of the second supporting wall 108. The input shaft 118 extends through the through-bore 112 and protrudes toward the first unit 70. The input shaft 118 is spline-coupled to the output shaft 96 of the first planetary gear unit 24 in an area facing the through-bore 112. In addition, the transmitting member 18 shown in FIG. 1 comprises the input shaft 118 and the output shaft 96 spline-coupled to each other for unitary rotation.

Figure 12:
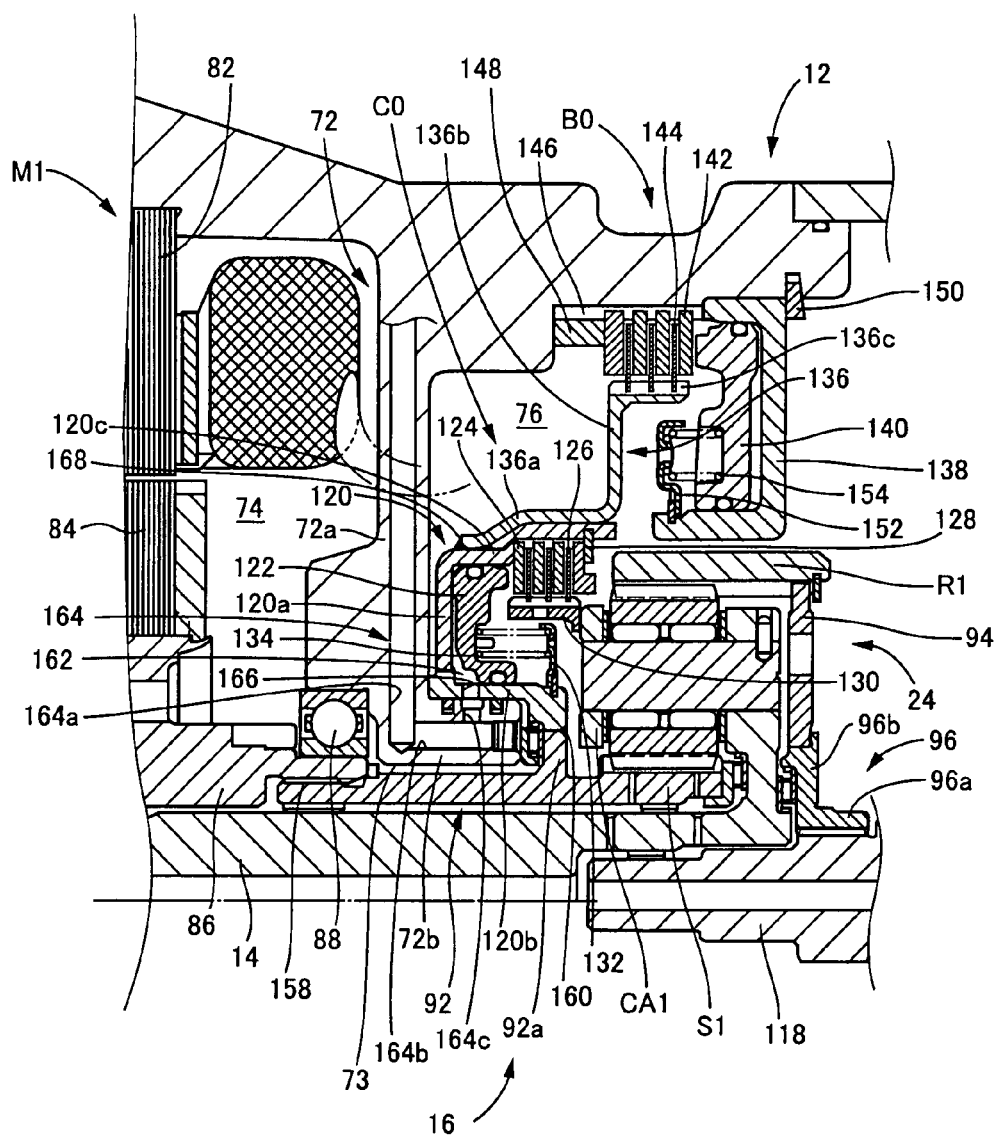
FIG. 12 is an enlarged view of the power distribution mechanism part shown in FIG. 11.

FIG. 12 is an enlarged view showing a part of the power distribution mechanism 16 shown in FIG. 11. The switching clutch C0 comprises a clutch cylinder 120 fitted to the tubular section 72b of the first supporting wall 72 on an outside thereof, a clutch piston 122 accommodated in the clutch cylinder 120, and a plurality of friction plates, including pressure plates 124 and frictional plate discs 126, which are engageable with each other when pressed with the clutch piston 122.

The clutch cylinder 120 comprises a bottom section 120a extending parallel to the vertical section 72a of the first supporting wall 72, a radially inward tubular section 120b coupled to a radially inward end of the bottom section 120a and fitted to the tubular section 72b of the first supporting wall 72 on an outer periphery thereof, and a radially outward tubular section 120c connected to the bottom section 120a on an outer peripheral end thereof. The radially inward tubular section 120b of the clutch cylinder 120 is joined to a radially protruding section 92a formed on the sun gear shaft 92 at a welded portion 160. Thus, the clutch cylinder 120 is made unitarily rotatable with the sun gear shaft 92.

The plurality of friction plates 124 are spline-coupled to an inner peripheral wall of the radially outward tubular section 120c of the clutch cylinder 120. Further, a snap ring 128 is fixed to an inner peripheral wall of the radially outward tubular section 120c in an opening portion of the clutch cylinder 120 at a position axially outward from the friction plate 124 closest to the opening portion of the clutch cylinder 120.

Meanwhile, the plural friction plates 126, intervening between the plural friction plates 124, are spline-coupled to an outer circumferential periphery of a clutch hub 130 being connected to the first carrier CA1 on an outer peripheral end thereof and axially extending toward the clutch piston 122 in parallel thereto. A radially protruding spring engagement plate 132 is disposed on an outer peripheral wall of the radially inward tubular section 120b of the clutch cylinder 120 at an opening end portion thereof in an area radially inward the clutch hub 130 to be axially immovable toward the first planetary unit 24. A return spring 134 is interposed between the spring engagement plate 132 and the clutch piston 122.

An oil chamber 162 is defined between the clutch piston 122 and the bottom section 120a of the clutch cylinder 120. The partition wall 72 is internally formed with an oil passage 164 through which actuating oil is introduced into the oil chamber 162. That is, a first oil passage 164a is formed in the vertical section 72a of the partition wall 72 in a radial direction thereof for actuating oil to be supplied from an outside area of the case 12. The tubular section 72b is formed with an axially extending second oil passage 164b, communicating with the first oil passage 164a, and a radially extending third oil passage 164c opening to the radially inward tubular section 120b of the clutch cylinder 120. In addition, the radially inward tubular section 120b of the clutch cylinder 120 also has an oil passage 166 formed in communication with the third oil passage 164c and opening to the oil chamber 162.

The brake hub (that is, a hub member) 136 comprises an radially inward tubular section 136a fitted to an outer periphery of the radially outward tubular section 120c of the clutch cylinder 120, a connecting section 136b having an inner peripheral end connected one end of the radially inward tubular section 136a in an area opposite to the first supporting wall 72 and extending radially outward, and an radially outward tubular section 136c having one end connected to an outer peripheral end of the connecting section 136b and axially extending in a direction opposite to the radially inward tubular section 136a. The radially inward tubular section 136a is bonded to the radially outward tubular section 120c of the clutch cylinder 120 at a welded portion 168 for unitary rotation with the clutch cylinder 120 and the brake hub 136.

The switching brake B0 comprises the above brake hub 136, a brake cylinder 138 internally fitted to the first case 12a, a brake piston 140 accommodated in the brake cylinder 138, and a plurality of inwardly oriented friction plates 142 and outwardly oriented friction plates 144 engageable with each other when forced with the brake piston 140.

An outer circumferential periphery end portion (an end portion of the case 12) of the vertical section 72a of the first supporting wall 72 has a thick wall extending toward the switching brake B0. The first case 12a has an inner circumferential wall formed with a spline teeth 146 extending from an end face closer to the switching brake B0 of the vertical section 72a of the first supporting wall 72, to an end face of the brake cylinder 138 on a side facing the first supporting wall 72. The plurality of inwardly oriented friction plates 142 is spline-coupled to the spline teeth 146. In addition, a tubular spacer member 148 is interposed between the innermost friction plate 142 among the plurality of inwardly oriented friction plates 142 and the first supporting wall 72. Meanwhile, the plurality of outwardly oriented friction plates 144 is spline-coupled to an outer circumferential periphery of the radially outward tubular section 136c of the brake hub 136.

The brake cylinder 138 is brought into abutting engagement with side faces of the spline teeth 146 and inhibited from axially moving in one direction. In addition, a snap ring 150 fixed to the first case 12a inhibits the brake pedal 138 from axially moving in the other direction. The brake cylinder 138 has an opening end toward which a spring engagement plate 152 protrudes to be axially immovable toward the first supporting wall 72. A return spring 154 is interposed between the spring engagement stop plate 152 and the brake piston 140.

In the present embodiment, as set forth above, the power distribution mechanism 16 distributing the output of the engine 8 to the first electric motor M1 and the transmitting member 18 is provided with the switching clutch C0 and the switching brake B0 operative to function as the differential action limiting device. That is, the switching clutch C0 and the switching brake B0 selectively place the power distribution mechanism 16 in the differential state for the differentiating action to be operated, that is, for instance, the continuously variable shifting state for the electrically controlled continuously variable transmission to be operative with the speed ratio being continuously variable, and the non-differential state for the differentiating action to be inoperative, that is, for instance, the fixed shifting state for the power transmission to be operative with a fixed speed ratio. Thus, the power transmitting states is realized in a broad range.

Additionally, when the engine 8 is operating in the high output region, the power distribution mechanism 16 is placed in the fixed shifting state, which means the continuously variable shifting state is effectuated in regions where the vehicle runs in the lower/medium state and in the lower/medium output. This minimizes the maximum value of electrical energy to be generated by the first electric motor M1, that is, electric energy to be transferred with the first electric motor M1. In other words, an electrical reaction force for the first electric motor M1 to guarantee can be minimized, achieving miniaturizations of the first electric motors M1 and the second electric motor M2.

Further, an interspace between the two electric motors M1, M2 can be effectively utilized as a space for accommodating the first planetary gear unit 24 (that is, the differentiating unit), the switching clutch C0 and the switching brake B0. Accordingly, the drive apparatus 10 can be minimized in structure. In particular, an air space in an outer diametric side of the first planetary gear unit 24 can be utilized as an air space for the switching brake B0 to be placed, enabling the drive apparatus 10 to be reduced in an axial dimension.

Further, since the switching clutch C0 and the switching brake B0 are composed of the hydraulic-type frictionally coupling devices, hydraulic passages need to be provided for supplying actuating oil to the switching clutch C0 and the switching brake B0 from the hydraulic control circuit 42. In this case, if the switching clutch C0 and the switching brake B0 are placed to be apart from each other, at least one of the switching clutch C0 and the switching brake B0 becomes far from the hydraulic control circuit 42 with the resultant fear of a difficulty occurring in a layout of hydraulic passages.

In addition, illustrated embodiment is provided with the automatic power transmission 20 composed of the first clutch C1 or the like including the hydraulic-type frictionally coupling devices, which arises a problem in performing a layout of the hydraulic passages between the hydraulic control circuit 42 and the hydraulic-type frictionally coupling devices C0, B0, C1 or the like. In the illustrated embodiment, however, since both of the switching clutch C0 and the switching brake B0 are disposed between the two electric motors M1, M2 to allow the switching clutch C0, the switching brake B0 and the hydraulic-type frictionally coupling device of the automatic power transmission 20 to be placed in a relatively close distance from each other, providing an ease of performing a layout of hydraulic passages.

On the contrary, in a case where the brake piston 140 forces the friction plates 142, 144 against the urging force of the return spring 154, a surface of the partitioning wall 72 facing the spacer member 148 serves as an abutment surface with which the friction plates 142, 144 are brought into abutting engagement via the spacer member 148. Thus, the partitioning wall 72 and the brake piston 140 with the spacer member 148 intervening therebetween press the pluralities of friction plates 142, 144 into mutually engaging states. This interrupts the rotation of the first sun gear S1 coupled to the switching brake B0 via the clutch cylinder 120. A reaction force arising with such halted rotation of the first sun gear S1 is born with the case 12 to which the pressure plates 14 are spline-coupled, and is not transferred to the brake cylinder 138.

In contrast, if the brake cylinder 138 is axially elongated toward the partitioning wall 72 for supporting the pressure plates 142 to be non-rotatable to each other, the reaction force accompanied by the halted rotation of the first sun gear S1 is also transferred to the brake cylinder 138. Thus, an outer periphery of the brake cylinder 138 needs to be formed with an antirotation recess and the case 12 also needs to be formed with a protrusion engageable with such the recess. In the illustrated invention, however, no reaction force accompanied with the halted rotation of the first sun gear S1 is transferred to the brake cylinder 138. Thus, no need arises for forming such an antirotation recess and such the protrusion engageable therewith.

In the illustrated embodiment, as set forth above, the switching brake B0 selectively places the first planetary gear unit 24 of the drive apparatus 10 in a differential state operative to function as an electrically continuously variable transmission and a locked state rendering the differential state inoperative, enabling a power transmitting state to be performed in a broad range. In addition, if the first planetary gear unit 24 is placed in the locked state in the high output running, the differential device is rendered operative to serve as the power transmission to electrically vary a shifting speed ratio under a region that lies in a low/medium speed running and a low/medium output running of the vehicle. This enables the minimization of the maximum value of electrical energy to be generated by the first electric motor M1, that is, electric energy to be transmitted from the first electric motor M1. This allows the first electric motor or the drive apparatus 10 including such a electric motor to be minimized. Moreover, the partitioning wall 72 with which the first electric motor M1 is supported is utilized as a member for the pluralities of friction plates 142, 144 of the switching brake B0 to be forced against each other. Thus, no separate member needs to be provided for sandwiching the pluralities of friction plates 142, 144, resulting in a reduction of the drive apparatus in an axial dimension by that extent.

In the illustrated embodiment, further, since the air space in the outer diametric area of the first planetary gear unit 24 is utilized as the air space for the switching brake B0 to be placed, the drive apparatus 10 can be further reduced in an axial dimension.

In the illustrated embodiment, furthermore, since the clutch cylinder 120 of the switching clutch C0 and the brake hub 136 are unitized with each other by welding, no need arises for a thrust bearing or a washer and the like to be employed for the brake hub 136 to be placed in an axially fixed position. This enables a reduction in the number of component parts. Also, there is no problem of durability that would otherwise occur when the thrust bearing or the washer are located in a comparatively large diametric area with a high circumferential velocity.

While the present invention has been described above with reference to the illustrated embodiment shown in the accompanying drawings, the present invention may be implemented in other modes.

For instance, in the illustrated embodiment, the drive apparatus 10 is structured, to enable the power distribution mechanism 16 to be switched in the differential state and the non-differential state, for the continuously variable shifting state functioning as the electrically continuously variable transmission and the step-variable shifting state functioning as the step-variable shifting transmission. However, the switching between the continuously variable shifting state and the step-variable shifting state is performed as one mode of placing the power distribution mechanism 16 in the differential state and the non-differential state. Even if, for instance, when placed in the differential state, the power distribution mechanism 16 may be arranged to function as a step-variable transmission with the shifting speed ratio thereof made variable, not in a continuous mode but in a stepwise mode. In other words, the differential state/non-differential state and the continuously variable shifting state/step-variable shifting state of the drive apparatus 10 (the power distribution mechanism 16) do not necessarily fall in a one-on-one correspondence, the drive apparatus 10 needs not necessarily formed in a structure to enable the switching between the step-variable shifting state and the continuously variable shifting state.

In the power distribution mechanisms 16 in the illustrated embodiments, the first carrier CA1 is fixed to the engine 8, and the first sun gear S1 is fixed to the first electric motor M1, and the first ring gear R1 is fixed to the transmitting member 18. However, such connecting arrangement is not essential, and the engine 8, first electric motor M1 and transmitting member 18 are fixed to respective ones of the three elements CA1, S1 and R1 of the first planetary gear set 24.

Although the engine 8 is directly connected to the drive apparatus input shaft 14 in the illustrated embodiments, it may be operatively connected to the drive apparatus input shaft 14 through gears, a belt or the like, and need not be disposed coaxially therewith.

In the illustrated embodiments, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18.

Although the power distribution mechanism 16 is provided with both the switching clutch C0 and the switching brake B0, it need not be provided with both of them, and may be provided with only one of the switching clutch C0 and brake B0. Although the switching clutch C0 selectively connects the sun gear S1 and carrier CA1 to each other, it may selectively connect the sun gear S1 and ring gear R1 to each other, or the carrier CA1 and ring gear R1. In essence, the switching clutch C0 sufficiently connects any two of the three elements of the first planetary gear set 24.

The switching clutch C0 in the embodiment is engaged to establish the neutral position "N" in the drive apparatus 10, but the neutral position need not be established by engagement thereof.

The hydraulic-type frictional coupling devices such as the switching clutch C0 and switching brake B0 may be a coupling device of a magnetic-powder type, an electromagnetic type or a mechanical type, such as a powder (magnetic powder) clutch, an electromagnetic clutch and a meshing type dog clutch. Also, when using the wet and multi-plate type frictional coupling device, a cancel chamber for canceling a centrifugal oil pressure may be provided.

In the illustrated embodiment, further, while the step-variable type automatic power transmission 20 is disposed in the power transmitting path between the transmitting member 18 serving as the output member of the power distribution mechanism 16 and the drive wheels 38, a power transmitting device of the other type such as, for instance, a continuously variable transmission (CVT) may be provided or may not be necessarily provided. In case of such a continuously variable transmission (CVT), the power distribution mechanism 16 is placed in a fixed speed shifting state and serves in a step-variable shifting state as a whole. The term "step-variable shifting state" used herein refers to a state wherein power transmission is achieved mainly in a mechanical transmitting path without using an electrical path.

In an alternative, the continuously variable transmission may be configured to preliminarily store a plurality of fixed speed ratios in correspondence to gear-shift positions of a step-variable transmission to allow the gear shift to be executed using such a plurality of fixed speed ratios. Moreover, in a case where the step-variable type automatic power transmission is provided, the structure of the step-variable type automatic power transmission is not particularly limited to such a structure of the illustrated embodiment and no particular limitation is intended in the number of planetary gear units, the number of gear-shift positions and a matter whether or not the clutch C and the brake B are selectively coupled to component elements such as the planetary gear units.

In the illustrated embodiment, although the drive apparatus 10 comprises the drive apparatus for hybrid vehicle in which the drive wheels 38 are driven with torques of the first electric motor M1 or the second electric motor M2 in addition to the engine 8, the present invention may also be applied even to a drive apparatus for vehicle in which the power distribution mechanism 16 has only a function of a continuously variable transmission, referred to as an electric CVT, in which no hybrid control is performed.

Furthermore, the power distribution mechanism 16 in the illustrated embodiment may comprise a differential gear unit wherein, for instance, a pinion drivably rotated with an engine and a pair of bevel gears meshing with the pinion are operatively connected to the first electric motor M1 and the second electric motor M2.

Moreover, while the power distribution mechanism 16 in the illustrated embodiment is composed of one set of planetary gear unit, it may comprise more than two planetary gear units that function as a power transmission with more than three stages in a fixed shifting state.

Further, while the illustrated embodiment is provided with the automatic power transmission 20 including the three planetary gear sets 26, 28, 30, in place of these components, a speed reduction mechanism including one planetary gear set may be provided as disclosed in Patent Literature 1. Furthermore, even in a case where an automatic power transmission is provided, the structure of the automatic power transmission is not limited to such a structure in the illustrated embodiment, and no particular limitation is intended in the number of planetary gear units, the number of gear-shift positions and a matter whether or not the clutch C and the brake B are selectively coupled to component elements such as the planetary gear units.

Also, the particular arrangement described absolutely represents one illustrative embodiment, and the present invention can be implemented in various modifications and improvements, according to knowledge of the skilled person in this technical field.

The invention claimed is:

1. A drive apparatus for a vehicle having a differential device through which an output of a drive power source is distributed to a first electric motor and a transmitting member, and a second electric motor disposed between the transmitting member and drive wheels, comprising:
   a differential action limiting device for selectively switching the differential device in a differential state and a locked state;
   the differential device and the differential action limiting device being disposed between the first electric motor and the second electric motor;
   a case accommodating the first electric motor, the differential device and the second electric motor therein; and
   a partition wall protruding inwardly from the case to partition an inside of the case into a plurality of compartments and having a convex portion of thick-wall shape formed at an outer circumferential periphery end portion thereof, the convex portion protruding inward toward an inside of the case,
   wherein the differential action limiting device includes a brake including a plurality of friction plates and a piston for forcing the plurality of friction plates to be coupled to each other, for coupling rotating elements forming the differential device to a non-rotating member; and
   upon movement of the piston toward the convex portion of the partition wall, the piston and the convex portion of the partition wall pressurize the plurality of friction plates into a coupled condition.

2. The drive apparatus for vehicle according to claim 1, further comprising a supporting member for rotatably supporting a rotor of the first electric motor;
   the differential device including three rotating elements including a first rotary element coupled to the drive power source, a second rotary element coupled to the first electric motor, and a third rotary element coupled to the transmitting member;
   the differential action limiting device including a clutch through which among the three rotating elements, two rotating elements are coupled to each other; and
   the clutch being placed on one side of the supporting member in opposition to the first electric motor.

3. The drive apparatus for vehicle according to claim 2, wherein the supporting member is provided with an oil passage for supplying oil to a hydraulic-type frictionally coupling device constituting the differential action limiting device.

4. The drive apparatus for vehicle according to claim 1, wherein the differential device includes three rotating elements having a first rotary element coupled to the drive power source, a second rotary element coupled to the first electric motor, and a third rotary element coupled to the transmitting member,
   the second rotary element is coupled to a non-rotating member through the brake; and
   the brake being placed in a radially outward area of the differential device.

5. The drive apparatus for vehicle according to claim 1, wherein the differential device includes three rotating elements including a first rotary element coupled to the drive power source, a second rotary element coupled to the first electric motor, and a third rotary element coupled to the transmitting member;
   the differential action limiting device including a clutch through which, of the three rotating elements, two rotating elements are coupled to each other, and the brake through which the second rotary element is coupled to a non-rotating member; and
   both the clutch and the brake including hydraulic-type frictionally coupling devices.

6. The drive apparatus for vehicle according to claim 5, further comprising a gear device including a hydraulic-type frictionally coupling device disposed between the second electric motor and the drive wheels.

7. The drive apparatus for vehicle according to claim 1, wherein the brake is disposed in a radially outward area of the differential device.

8. The drive apparatus for vehicle according to claim 1, wherein the partition wall serves to rotatably support the first electric motor.

9. The drive apparatus for vehicle according to claim 1, wherein the brake includes a hub member supporting parts of the plurality of friction plates to be non-rotatable relative to each other, for coupling the rotating elements forming the differential device to the non-rotating member;
   the differential action limiting device includes a clutch including a plurality of friction plates engageable with each other, a piston forcing the plurality of friction plates, and a cylinder member for accommodating the piston and operative to allow at least two rotating elements including a rotating element coupled to the non-rotating member with the brake, of rotating elements forming the differential device to be coupled to each other; and the cylinder member of the clutch and the hub member of the brake being unitized to each other by bonding.

10. The drive apparatus for vehicle according to claim 9, wherein the partition wall includes hydraulic passages through which actuating oil is supplied to the piston of the clutch.

11. The drive apparatus for vehicle according to claim 9, wherein the brake is disposed in a radially outward area of the differential device.

12. The drive apparatus for vehicle according to claim 9, wherein the plurality of friction plates include a plurality of outwardly oriented friction plates spline-coupled to an outer circumferential periphery of a radially outward tubular section of the hub member.

13. The drive apparatus for vehicle according to, claim 1, wherein the second electric motor is operatively coupled to a power transmitting path between the transmitting member and the drive wheels; the differential device and the brake forming a continuously-variable shifting portion that functions as an electrically continuously variable transmission; and upon release of the brake the continuously-variable shifting portion being placed in a differential state to be operative as the electrically continuously variable transmission, and upon engagement of the brake a differential action of the continuously-variable shifting portion being locked.

14. The drive apparatus for vehicle according to claim 1, wherein the differential action limiting device is provided on the differential device and functions as a differential state switching device for switching the differential device to the differential state operative as a transmission to electrically change a shifting ratio due to a differential operation thereof, or to a non-differential state to mechanically transmit power due to the locked state of the differential device.

15. The drive apparatus for vehicle according to claim 1, wherein the plurality of friction plates include a plurality of inwardly oriented friction plates and a plurality of outwardly oriented friction plates.

16. The drive apparatus for vehicle according to claim 15, wherein a tubular spacer member is interposed between an innermost friction plate of the plurality of inwardly oriented friction plates and the convex portion.

17. The drive apparatus for vehicle according to claim 16, wherein the plurality of inwardly oriented friction plates are spline-coupled to spline teeth extending from the case.

18. The drive apparatus for vehicle according to claim 15, wherein the piston is configured to directly contact an outermost friction plate of the plurality of inwardly oriented friction plates when the piston forces the plurality of friction plates to be coupled to each other.

\* \* \* \* \*